(12) United States Patent
Cartwright

(10) Patent No.: US 10,708,436 B2
(45) Date of Patent: *Jul. 7, 2020

(54) NORMALIZATION OF SOUNDFIELD ORIENTATIONS BASED ON AUDITORY SCENE ANALYSIS

(71) Applicant: DOLBY LABORATORIES LICENSING CORPORATION, San Francisco, CA (US)

(72) Inventor: Richard J. Cartwright, Killara (AU)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/956,470

(22) Filed: Apr. 18, 2018

(65) Prior Publication Data

US 2018/0295241 A1 Oct. 11, 2018

Related U.S. Application Data

(63) Continuation of application No. 14/776,322, filed as application No. PCT/US2014/026492 on Mar. 13, 2014, now Pat. No. 9,979,829.

(60) Provisional application No. 61/798,257, filed on Mar. 15, 2013.

(51) Int. Cl.
 *H04M 3/56* (2006.01)
 *H04S 7/00* (2006.01)

(52) U.S. Cl.
 CPC ............ *H04M 3/568* (2013.01); *H04S 7/304* (2013.01); *H04S 2400/11* (2013.01); *H04S 2420/01* (2013.01)

(58) Field of Classification Search
 None
 See application file for complete search history.

(56) References Cited

U.S. PATENT DOCUMENTS

| | | |
|---|---|---|
| 5,020,098 A | 5/1991 | Celli |
| 5,390,256 A | 2/1995 | Mandell |
| 5,991,385 A | 11/1999 | Dunn |

(Continued)

FOREIGN PATENT DOCUMENTS

| | | |
|---|---|---|
| EP | 1390942 | 2/2004 |
| EP | 1393300 | 3/2004 |

(Continued)

OTHER PUBLICATIONS

Beritelli, F. et al, "Performance Evaluation and Comparison of G.729/AMR/Fuzzy Voice Activity Detectors," Signal Processing Letters, IEEE, vol. 9, Issue 3, pp. 85-88, Mar. 2002.

(Continued)

*Primary Examiner* — Qin Zhu

(57) ABSTRACT

Embodiments are described for a soundfield system that receives a transmitting soundfield, wherein the transmitting soundfield includes a sound source at a location in the transmitting soundfield. The system determines a rotation angle for rotating the transmitting soundfield based on a desired location for the sound source. The transmitting soundfield is rotated by the determined angle and the system obtains a listener's soundfield based on the rotated transmitting soundfield. The listener's soundfield is transmitted for rendering to a listener.

22 Claims, 10 Drawing Sheets

(56) References Cited

U.S. PATENT DOCUMENTS

| | | |
|---|---|---|
| 6,021,206 A | 2/2000 | McGrath |
| 6,021,386 A | 2/2000 | Davis |
| 6,718,042 B1 | 4/2004 | McGrath |
| 6,850,496 B1 | 2/2005 | Knappe |
| 7,012,630 B2 | 3/2006 | Curry |
| 7,508,947 B2 | 3/2009 | Smithers |
| 7,809,453 B2 | 10/2010 | Reichelt |
| 7,924,995 B2 | 4/2011 | Diethorn |
| 8,073,125 B2 | 12/2011 | Zhang |
| 8,103,006 B2* | 1/2012 | McGrath ............ H04S 3/02 381/1 |
| 8,144,881 B2 | 3/2012 | Crockett |
| 8,180,062 B2 | 5/2012 | Turku |
| 8,184,814 B2 | 5/2012 | Cvetkovic |
| 8,229,134 B2 | 7/2012 | Duraiswami |
| 8,396,574 B2 | 3/2013 | Smithers |
| 8,406,439 B1 | 3/2013 | Bedingfield, Sr. |
| 2001/0014854 A1 | 8/2001 | Stegmann |
| 2001/0033583 A1 | 10/2001 | Rabenko |
| 2002/0076034 A1 | 6/2002 | Prabhu |
| 2002/0116196 A1 | 8/2002 | Tran |
| 2002/0151996 A1 | 10/2002 | Wilcock |
| 2003/0007648 A1 | 1/2003 | Currell |
| 2005/0069203 A1 | 3/2005 | Khomo |
| 2005/0182620 A1 | 8/2005 | Kabi |
| 2006/0206221 A1* | 9/2006 | Metcalf ............ G10H 1/0091 700/94 |
| 2007/0165820 A1 | 7/2007 | Krantz |
| 2008/0056517 A1 | 3/2008 | Algazi |
| 2008/0144794 A1 | 6/2008 | Gardner |
| 2008/0267282 A1 | 10/2008 | Kalipatnapu |
| 2009/0010441 A1 | 1/2009 | Pallone |
| 2009/0116652 A1 | 5/2009 | Kirkeby |
| 2009/0147961 A1 | 6/2009 | Lee |
| 2009/0220065 A1 | 9/2009 | Ahuja |
| 2009/0222272 A1 | 9/2009 | Seefeldt |
| 2009/0252356 A1 | 10/2009 | Goodwin |
| 2009/0316913 A1* | 12/2009 | McGrath ............ H04S 3/02 381/20 |
| 2010/0070276 A1 | 3/2010 | Wasserblat |
| 2010/0150355 A1 | 6/2010 | Kon |
| 2010/0177903 A1 | 7/2010 | Vinton |
| 2010/0215164 A1 | 8/2010 | Sandgren |
| 2011/0004473 A1 | 1/2011 | Laperdon |
| 2011/0208331 A1* | 8/2011 | Sandler ............ H04S 7/30 700/94 |
| 2011/0316967 A1 | 12/2011 | Etter |
| 2012/0014527 A1 | 1/2012 | Furse |
| 2012/0116766 A1 | 5/2012 | Wasserblat |
| 2012/0262536 A1 | 10/2012 | Chen |
| 2013/0177168 A1* | 7/2013 | Inha ............ H04N 5/602 381/92 |
| 2013/0243201 A1 | 9/2013 | Algazi |
| 2014/0028778 A1 | 1/2014 | Shapiro |
| 2014/0241528 A1 | 8/2014 | Gunawan |
| 2014/0267560 A1 | 9/2014 | Bright-Thomas |
| 2015/0230040 A1* | 8/2015 | Squires ............ H04S 7/306 381/303 |
| 2015/0296086 A1 | 10/2015 | Eckert |

FOREIGN PATENT DOCUMENTS

| | | |
|---|---|---|
| EP | 1519363 | 3/2005 |
| EP | 1083769 | 6/2010 |
| EP | 2456184 | 5/2012 |
| WO | 2007/006856 | 1/2007 |
| WO | 2011/104418 | 9/2011 |
| WO | 2012/072798 | 6/2012 |
| WO | 2012/072804 | 6/2012 |
| WO | 2012/125855 | 9/2012 |

OTHER PUBLICATIONS

Bregman, Albert, "Auditory Scene Analysis: Hearing in Complex Environments," Thinking in Soun: The Cognitive Psychology of Human Audition, 1993, pp. 10-36.

Daniel, A., "Spatial Auditory Blurring and Applications to Multi-channel Audio Coding," Orange Labs—Lannion, CIRMMT—Schulic School of Music, Sep. 14, 2011.

Davis, A., "A Study of Voice Activity Detectors," Electrical and Computer Engineering, 2008.

Dickins, G. et al, "On Spatial Localization of a Wireless Transmitter from a Multisensor Receiver," 2nd International Conference on Signal Processing and Communications Systems, pp. 1-8, Dec. 15-18, 2008.

Freund, Y. et al, "A Decision-Theoretic Generalization of the on-Line Learning and an Application to Boosting," Proceedings of the Second European Conference on Computational Learning Theory, Mar. 13-15, 1995.

Gilg, V. et al, "Methodology for the Design of a Robust Voice Activity Detector for Speech Enhancement," International Workshop on Acoustic Echo and Noise Control, Sep. 2003.

Kularatna, N. et al, "Essentials of Modern Telecommunications Systems," Arctec House, May 2004.

Mac Caba, Cullann James "Surround Audio That Lasts: Future-Proof Ambisonic Recording and Processing Technique for the Real World" AES Apr. 2002.

Paulraj, A et al, "Estimation of Signal Parameters via Rotational Invariance Techniques—Esprit," Nineteenth Asilomar Conference on Circuits, Systems and Computers, Nov. 6-8, 1985.

Peltonen, Vesa "Computational Auditory Scene Recognition" Master of Science Thesis, Aug. 2001.

Ramirez, J. et al, "Voice Activity Detection. Fundamentals and Speech Recognition System Robustness," Robust Speech Recognition and Understanding, Jun. 2007.

Ravichandran, T. et al, "Performance Evaluation and Comparison of Voice Activity Detection Algorithms," International Journal of Soft Computing, vol. 2, Issue 2, pp. 257-261, 2007.

Schmidt, R.O. "Multiple Emitter Location and Signal Parameter Estimation" IEEE Transactions on Antennas and Propagation; IEEE Service Center, Piscataway, NJ, USA vol. AP-34, No. 3, Mar. 1, 1986, pp. 276-280.

Scholkopf, B. et al, "Learning with Kernels, Support Vector Machines, Regularization, Optimization, and Beyond," MIT Press, Dec. 15, 2001.

Stoica, P. et al, "Maximum Likelihood Methods for Direction-of-Arrival Estimation," IEEE Transactions on Acoustics, Speech and Signal Processing, vol. 38, Issue 7, Jul. 1990.

Valle, A. et al, "Simulating the Soundscape through an Analysis/Resynthesis Methodology," CIRMA, Universita di Torino, Music Technology Group, May 18-22, 2009.

* cited by examiner

NORMALIZATION OF SOUNDFIELD ORIENTATIONS BASED ON AUDITORY SCENE ANALYSIS

CROSS-REFERENCE TO RELATED APPLICATION

This application is a continuation application which claims the benefit of priority from U.S. patent application Ser. No. 14/776,322 filed Sep. 14, 2015 which is a 371 National Phase application of PCT/US2014/026492 filed Mar. 13, 2014 which claims priority to U.S. Provisional Patent Application No. 61/798,257 filed 15 Mar. 2013 which is hereby incorporated by reference in its entirety.

FIELD OF THE INVENTION

One or more implementations relate generally to audio telephony systems, and more specifically to soundfield telephony systems employing rotation of a soundfield to improve audio imaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Telephone conference ("teleconference") systems allow multiple users to participate in telephone calls by providing integrated speaker and microphone arrays in desktop telephones. Such systems allow multiple users seated around a table to simultaneously listen and talk to listeners at the other end of the phone line, and can use standard telephone lines or Internet telephony for Voice over Internet (VoIP) applications. Present teleconference and VoIP phones typically contain multiple microphones so that people in different areas of the room have a microphone that is aimed at least somewhat toward them.

The use of multiple microphones or appropriate signal processing technology can be used to derive some measure of source location from the input sound signals. Some present teleconference systems may attempt to retain the positional context of sound sources to provide spatial information associated with a conference call in order to help listeners identify speakers based on spatial location cues. In such systems, techniques such as head-related transfer functions (HRTF) and other similar methods are used to recreate the source soundfield such that sounds that emanate in front of, above, behind or next to the listener if he were located within the room are recreated in the same relative position upon playback to the listener. During face-to-face conversation, however, a listener normally turns to face a talker. Thus, conversational speech is normally received from the front of a listener. In conference call situations that utilize present spatial-aware devices, and in which a listener hears a binaural rendering of the soundfield over headphones or monitors, the listener may find it disturbing if talkers in the soundfield appear to come from the side or behind them, when they more naturally would expect the sound to come from in front of them.

Present teleconference systems also attempt to provide relatively high quality monophonic audio content through each microphone channel by reducing noise through various noise-reduction techniques. The multiple microphone channels are then compressed for transmission over standard telephone or IP (Internet Protocol) networks for playback through a regular telephone at the listening end. Such systems may be fine for certain business and consumer applications where voice content is most important, and the presence of noise and excessive dynamic range may be annoying or distracting. However, such systems effectively limit or even eliminate the true ambient audio environment of the original soundfield and convey a limited sterile representation of only a certain aspect of the entire audio content that may be available.

In summary, traditional phone systems collapse the talker's soundfield environment to a single omni-directional projection and do not allow listeners to focus on a particular talker or deduce context and other useful information based on relative locations of talkers. Systems that attempt to convey spatial information of talkers can create a confusing listening experience by projecting sound at irregular angles to the listener, when he or she would more properly expect to be facing a talker. Such systems also often employ filtering, noise reduction and compression to accentuate spoken content and facilitate transmission over bandwidth limited phone lines. By reducing noise and compressing the signal, these systems also do not faithfully recreate the original soundfield of the talker, thereby resulting in the loss of potentially useful information.

These and other deficiencies are overcome by a soundfield telephony system in which an entire soundfield, potentially including multiple talkers and noise sources with associated directionality, is transmitted for rendering and playback to a listener; and by a telephony system that uses sound source and environmental heuristic information to guide the rotation of a soundfield so that the primary talkers in a conference will be rendered at a desired location in the listener's soundfield.

BRIEF SUMMARY OF EMBODIMENTS

Embodiments include a soundfield system comprising a scene analysis unit, a transition control unit and a rotation component. The scene analysis unit receives a transmitting soundfield, the transmitting soundfield including a sound source at a location in the transmitting soundfield. The transition control unit determines a rotation angle for rotating the transmitting soundfield, the determination of rotation angle based on a desired location for the sound source. The rotation component rotates the transmitting soundfield by the determined rotation angle, obtains a listener's soundfield based on the rotated transmitting soundfield, and transmits the listener's soundfield for rendering to a listener through an endpoint device.

In one embodiment, the listener's soundfield is the rotated transmitting soundfield. In another embodiment, the rotation component transmits sounds from the sound source in a spatially-reduced format for rendering to a listener, and transmits the listener's soundfield for rendering to a listener through an endpoint device after the sound source is identified in the soundfield. Alternatively, the rotation component transmits the listener's soundfield for rendering to a listener after the rotation angle is determined for rotating the transmitting soundfield.

In yet another embodiment, the listener's soundfield is the rotated transmitting soundfield mixed with a second rotated transmitting soundfield. In this embodiment, the scene analysis unit further receives a second transmitting soundfield, the second transmitting soundfield including a second sound source at a second location in the second transmitting soundfield. The transition control unit further determines a second rotation angle for rotating the second transmitting soundfield, the determination based on a second desired location for the second sound source. The rotation component further rotates the second transmitting soundfield by the second determined rotation angle, and obtains the listener's soundfield by mixing the rotated transmitting soundfield with the rotated second transmitting soundfield. In an alternate embodiment, the first desired location and the second desired location are two different locations in the listener's soundfield.

The rotation component may further rotate the transmitting soundfield by a reference angle, the reference angle determined based on the location of the sound source. In one embodiment, the transmitting soundfield has two sound sources: the above mentioned sound source and an additional sound source. In this embodiment, the scene analysis unit identifies the sound source as the primary talker. The scene analysis unit may identify the sound source as a primary talker based on criteria like the sound source is the first talker in a telephone conversation, the sound source generates speech, or the sounds source is predominant in a telephone conversation relative to other sound sources in the transmitting soundfield, the predominance determined based at least in part on amount of time the talker is speaking in the telephone conversation.

Additionally, in one embodiment, the scene analysis unit may identify an additional sound source as the primary talker. The transition control unit may determine a second rotation angle for rotating the transmitting soundfield, wherein rotating the transmitting soundfield by second rotation angle places the additional sound source at the desired location. The rotation component may rotate the transmitting soundfield by the second rotation angle.

The primary talker and the primary talker's location in the listener's soundfield may also be selected by the listener. The listener may provide these selections to the soundfield system through a user interface.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
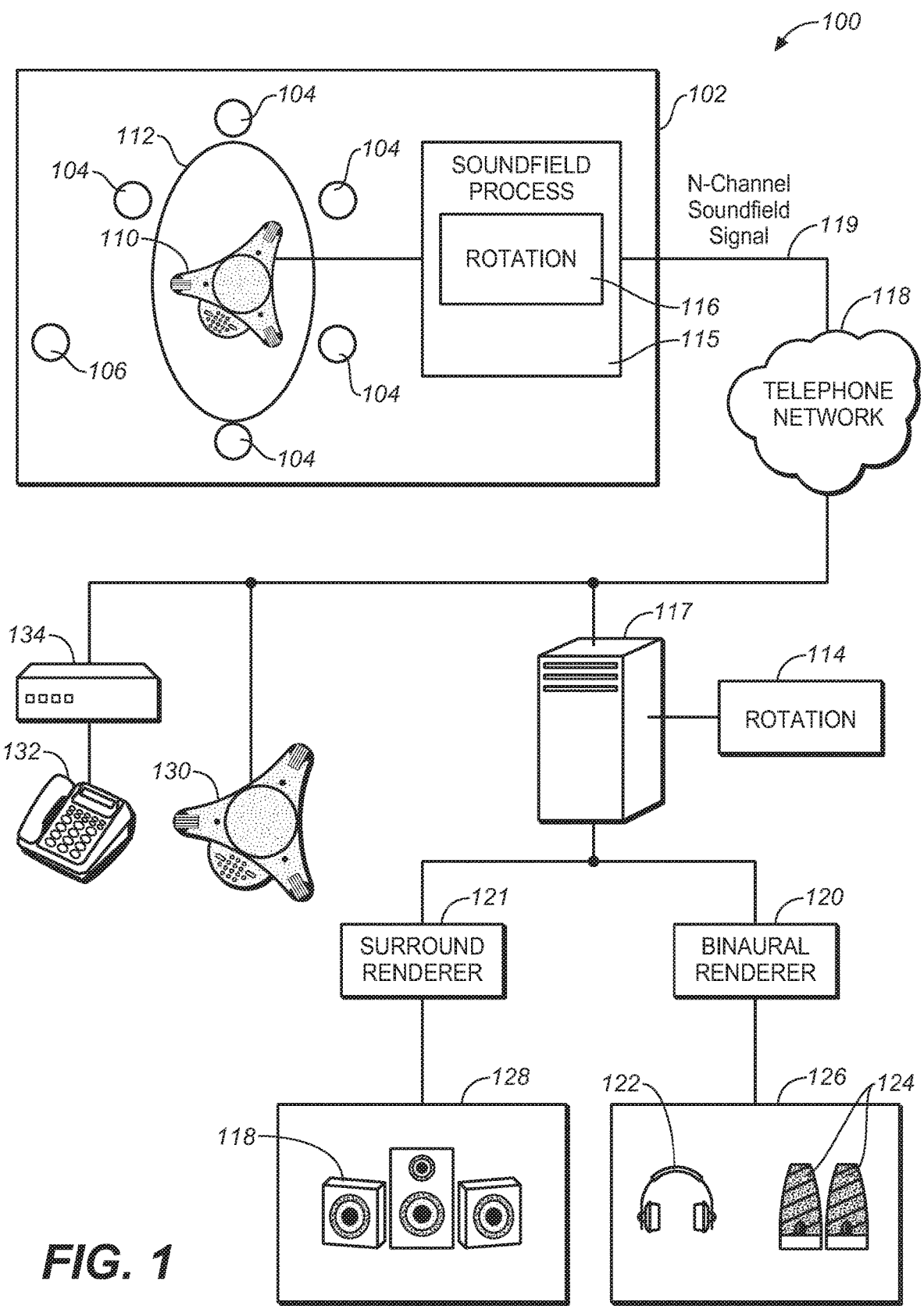
FIG. 1 illustrates a system that implements a soundfield processing method under an embodiment.

Embodiments are described for a soundfield processing system for teleconference applications that captures and maintains the soundfield of a transmitting call location including the spatial characteristics of all relevant sound sources within the transmitting location for transmission and rendering to a listener receiving the call. Embodiments include components and methods to determine relative locations of sound sources within the transmitting location and rotate the soundfield to locate a primary talker in the soundfield to a desired angle. The rotated soundfield is the listener's soundfield that renders the primary talker at a desired location in the listener's soundfield. Because the transmitting soundfield, instead of the primary talker in the transmitting soundfield, is rotated, additional sound sources in the transmitting soundfield are also rotated with the primary talker. Therefore, the sound sources remain at same locations relative to each other regardless of the amount of rotation applied to the transmitting soundfield. For example, a talker two feet to left of the primary talker in transmitting soundfield is rendered as two feet left of primary talker in listener's soundfield.

In one embodiment, a listener may be engaged in a conversation with talkers in a plurality of locations. For example, in a conference call, the listener may be in one location talking to talkers in two other locations. Embodiments of the described system receive a transmitting soundfield for each of the two other locations. The described embodiments determine the location of a primary talker in each of the two transmitting soundfields and rotate the soundfields to locate the primary talkers at a reference location (e.g., at zero degrees with respect to the device capturing the soundfield at the transmitting locations). The rotated soundfields are then rotated again by varying degrees (e.g., the first transmitting soundfield is rotated by −30 degrees and the second transmitting soundfield is rotated by +30 degrees) and mixed together into a resultant soundfield, i.e. the listener's soundfield. The latter rotation ensures that the primary talkers in each of the transmitting soundfield do not overlap each other in the listener's soundfield.

Aspects of the one or more embodiments described herein may be implemented in a telephone conference system that receives audio content from multiple talkers in a room for transmission over phone lines or computer network lines for playback to a listener located at a distance from the source over one or more telephone networks. Any of the described embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

For purposes of the present description, the following terms have the associated meanings: the term "talker" means a sound source that generates speech or spoken words and is typically a person but can also be a computer or automated process, the term "primary talker" means a first talker in a conversation or a dominant talker who is assumed to be the focus of attention of a listener; the term "sound source" means a source that generates noise or other sounds that are not necessarily speech, the terms "sound field" or "soundfield" mean an audio signal (typically, but not necessarily, a multichannel audio signal) capable of being rendered to generate speaker feeds for driving at least two loudspeakers (e.g., a pair of headphones) to emit sound perceivable by a listener as emanating from one or more sources, including at least one source at an apparent source location distinct from the actual location of any of the loudspeakers. An example of soundfield audio is stereo audio, which is capable of being rendered to generate a Left speaker feed for driving a Left speaker and a Right speaker feed for driving a Right speaker. The terms "transmitting soundfield" or "talker's soundfield" mean an audio signal (typically, but not necessarily, a multichannel audio signal) including signal representing sounds propagating at the talker's location, capable of being rendered to generate speaker feeds for driving at least two loudspeakers (e.g., a pair of headphones) to emit sound perceivable by a listener as emanating from one or more sources, including at least one source at an apparent source location distinct from the actual location of any of the loudspeakers; the term "listener's soundfield" or "soundfield of a listener" mean an audio signal (typically, but not necessarily, a multichannel audio signal) including signal representing sounds for propagation at the listener's location, capable of being rendered to generate speaker feeds for driving at least two loudspeakers (e.g., a pair of headphones) to emit sound perceivable by a listener as emanating from one or more sources, including at least one source at an apparent source location distinct from the actual location of any of the loudspeakers. The term "isotropic" means sound captured from any one direction at a microphone can be transported and replayed with the same degree of fidelity as sound from any other direction, "rotation" of a soundfield means transformation of the soundfield to move a first sound source in the soundfield to a location while maintaining the same relative location of at least one additional source in the soundfield with respect to the first sound source; and the term "surround sound" means an audio signal in which the position is coded as a channel identifier for playback through a pre-defined set of speaker zones with associated nominal locations, e.g., 5.1, 7.1, and so on.

Embodiments are directed to a soundfield processing system, which takes as input a multi-channel soundfield signal representation and produces a modified soundfield signal having the same format. In one embodiment, system input is captured through a microphone array that is placed in proximity to a number of talkers and other possible sound sources. The input is transformed to a specific format, denoted format S, before being presented to the system for processing. The output soundfield may then be transformed from format S to another representation for playback over headphones or loudspeakers at a listening location.

FIG. 1 illustrates a system that implements a soundfield processing method under an embodiment. As shown in diagram 100, a plurality of talkers 104 sit around a soundfield telephone 112 located in a room or suitable source environment 102. The talkers may be positioned in any appropriate location within the room, such as around a table 102 on which the soundfield telephone 112 is sitting. Some talkers 106 may be located further away from the phone than other talkers. Other sound sources may also be present in the room, such as other machines, loudspeakers, fans, and so on. These sources may generate deliberate sound, such as music, sound effects, and so on, or they may generate noise or ambience, which is generally unwanted or undesirable sound. Though the sound sources may generate sound or noise that is considered distracting in a phone call where it is assumed that speech is the most important content, this other audio can be helpful in defining the source environment for the listener.

The soundfield telephone 112 captures a multi-channel representation of the soundfield with N channels which is sent over a telephony network 118 to one or more listening areas (e.g., 126 and 128) or devices (e.g., 130 and 132) for playback to listeners at these locations.

It is generally useful in the context of a teleconferencing system to use soundfields wherein at least one talker is located at a known azimuth within each soundfield. For a teleconferencing system it is assumed that the most important audio content for a listener is speech or other oral content delivered by a talker, and in a room with several talkers, words from a single talker at a time is most comprehensible. During normal conversation, people tend to turn and face a talker, thus it is most natural for a listener to hear a primary talker as located at a desired location relative to the listener, e.g., directly in front of him or her. Embodiments are directed to systems and methods that rotate the transmitting soundfields to obviate the need for the listener to turn to place a perceived listener at a desired location.

As shown in FIG. 1, system 100 includes a computing component like a soundfield module 115 that includes, among other functional components, a rotation component 116. The rotation component 116 implements a set of methods for controlling the angle of rotation for the soundfield generated in source area 102. The soundfield module 115 may also include other components that perform other processing such as scene analysis, and transition/directionality control that allow the sent signal to be smoothly transitioned from a monophonic to a full soundfield representation.

For the embodiment shown in FIG. 1, the soundfield module 115 may be included in a soundfield telephone 112 at the sending end of the system, i.e., ahead of telephony network 118, or included in a device at the listening or receiving end of the system 100, i.e., after the telephony network 118. Thus, one or more of the soundfield modules, such as rotation module 116 may be included in a central server 117 located in or coupled to telephony network 118. Alternatively, it may be included in any of the receiving endpoints 130, 116 or 120.

As shown in FIG. 1, system 100 includes a central server 117 that acts as a teleconferencing bridge which mixes together feeds from multiple soundfield telephony devices to be rendered and heard together at the appropriate listening location. The server 117 provides rendering components, which perform appropriate processing of the generated soundfield signals for playback to the listener in the listening area. The teleconference content may be played back through any appropriate playback system, such as binaural systems, surround sound systems, object-based audio playback systems, and so on. FIG. 1 illustrates two possible listening environments 126 and 128. Listening environment 126 is a binaural listening environment in which the audio content is typically played to the user through headphones 122 (e.g., a telephony headset with an included lapel microphone). In certain cases, playback to the listener may be through cross-talk cancelling speakers or monitors 124 (to approximate a binaural playback medium). For this listening environment 126, a binaural renderer 120 processes the soundfield audio content transmitted over telephony network 118 into the stereo signals for playback to the listener. The binaural renderer 120 typically performs HRTF-based virtualization in the case of playback through headphones) and HRTF-based virtualization with crosstalk cancellation (in the case of playback through stereo speakers.

Listening environment 128 represents a surround sound environment that contains a set of surround sound speakers, such as in a 5.1, 7.1, 9.1 or other surround sound configuration, as known to those of ordinary skill in the art. For this environment, a surround sound renderer 121 processes the soundfield audio content transmitted over telephony network 118 into the appropriate surround sound signals for playback to the listener. Other listening endpoints may include a second soundfield phone 130 that is the same type of phone as the source soundfield telephone 112 with multiple speakers and microphones, or a regular monophonic telephone 132. In the case of a regular telephone 132 endpoint, any requisite soundfield processing may be performed at the PSTN (public switched telephone network) gateway 134. The telephone endpoint devices 130 and 132 may be coupled directly to the telephony network 118 or through one or more intermediate gateway devices 134 or the server 117.

Figure 2:
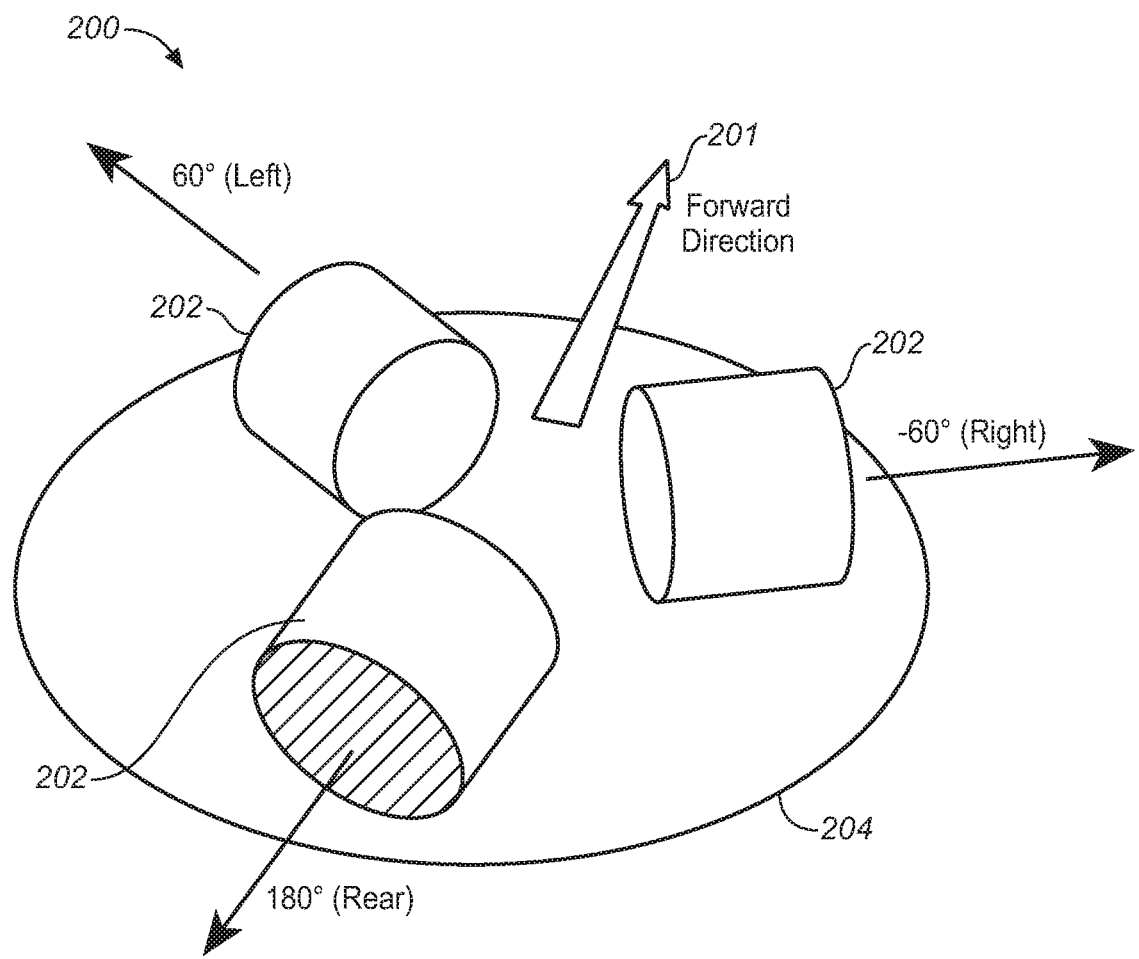
FIG. 2 illustrates an arrangement of microphones in an example soundfield telephone, under an embodiment.

In an embodiment, the soundfield telephone 112 comprises a desk or table mounted unit that includes a single microphone or a number of microphones (e.g., from two to six) arranged in an array that facilitates the maximum pickup of sounds in room 102. FIG. 2 illustrates an arrangement of microphones in an example soundfield telephone, under an embodiment. As shown in FIG. 2, three separate microphones 202 are mounted on a base 204 with the primary axis of each microphone oriented equidistantly around 360 degrees. Thus as shown in FIG. 2, the three microphones are oriented 120 degrees apart from one another. The soundfield telephone 200 has a specified forward direction 201, which defines a 0 degree primary axis for the phone. The input angle of each microphone 202 is defined with respect to this direction in a counterclockwise direction, and thus as shown in FIG. 2, one microphone is oriented 60 degrees to the left of direction 201 (+60°), another microphone is oriented 60 degrees to the right of direction 201 (−60°), and the third microphone is oriented 180 degrees to the rear of direction 201. The microphones may be tilted upwards or downwards relative to the base 204 depending on orientation, mounting configuration, size, and other factors associated with the teleconference system 100 and source room 102. For example, for a floor or low table mounted setting, the microphones may be tilted upwards at an appropriate angle, and for a wall or ceiling mounted setting, the microphones may be tilted downwards. FIG. 2 illustrates one instance of an example microphone arrangement of a soundfield telephone. In general, any practical number and arrangement of microphones may be possible. For example, an alternative embodiment may comprise four microphones oriented 90 degrees apart or five microphones oriented 72 degrees apart or six microphones oriented 60 degrees apart, and so on. The microphone array maybe integrated with the phone as in a unitary device, or they may be provided separately from the phone and coupled via a physical or wireless link.

Figure 3:
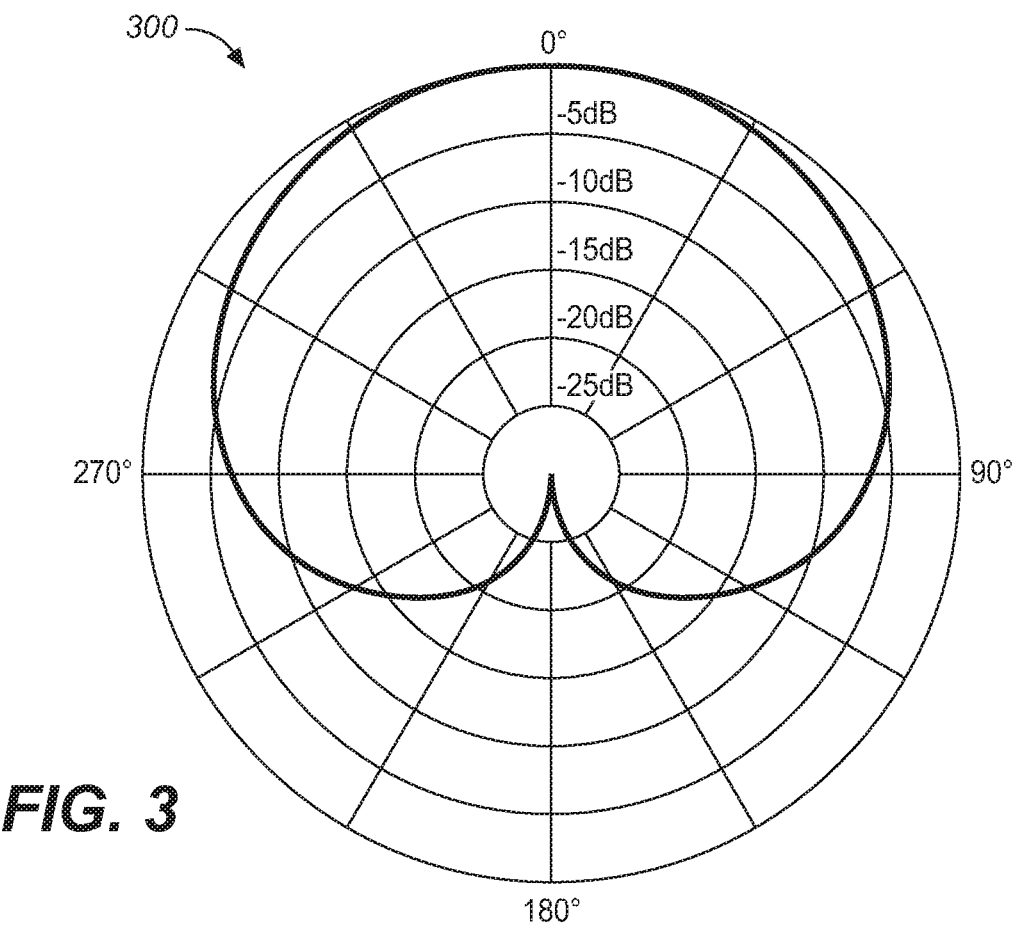
FIG. 3 illustrates the sensitivity pattern for an example cardioid microphone used in a soundfield telephone, under an embodiment.

In an embodiment, the microphone or microphones of soundfield telephone 200 picks up sound from multiple talkers and/or sound/noise sources to generate a soundfield for the room that the telephone is located. The microphones 202 of soundfield telephone 200 may be of any appropriate size, power rating, and type. In one embodiment, each microphone 202 is a cardioid microphone. In general, a cardioid microphone is a unidirectional microphone that picks up minimal ambient noise. FIG. 3 illustrates the sensitivity pattern for an example cardioid microphone used in a soundfield telephone, under an embodiment. The cardioid sensitivity pattern allows for most of the sound to be picked up from the front of the microphone, while minimal noise is picked up from the rear and only marginal noise is picked up from the sides. This makes the cardioid microphone useful in teleconference situations where several microphones may be used at one time, as shown in FIG. 2.

As shown in FIG. 1, the soundfield telephone 112 produces an N-channel soundfield signal 119 that is processed by soundfield module 115. The soundfield signal 119 is represented by a format that encodes directionality information that is associated with each sound source that is input to the one or more microphones of telephone 112. For each microphone 202 in the soundfield telephone, sound pressure information of sound signals emanating from sources speaking into or picked up by the microphone is included along with the directionality of the sound signals from each source to form the soundfield representation. Thus, for example, if there are two talkers speaking into a microphone, the soundfield representation would provide a unique direction for each talker. The directionality can be expressed in any manner or format appropriate to the processing configuration of system 100.

In one embodiment, signal 119 uses a format denoted format S, which is a first-order horizontal B-format soundfield signal (W, X, Y). Soundfield module 115 then produces as an output a modified signal (W', X', Y'). In this case, the soundfield is a 3-channel soundfield (N=3), where n=W, X, Y. In general, B-format refers to a first order horizontal isotropic basis representation of a spatial wavefield, namely the variation of pressure over space and time represented in a volume around the captured point constrained by the wave equation and linearized response of air to sound waves at typical acoustic intensities. It should be noted that such a representation can be extended to higher orders, and that in first order, the representations of B-Format, modal and Taylor series expansion are linearly equivalent in each separate channel. It should further be noted that the B-format representation is only one example format that may be used for the soundfield signal 119 and any other format that represents directionality and sound pressure information for the one or more sources in the soundfield may be used.

Figure 4:
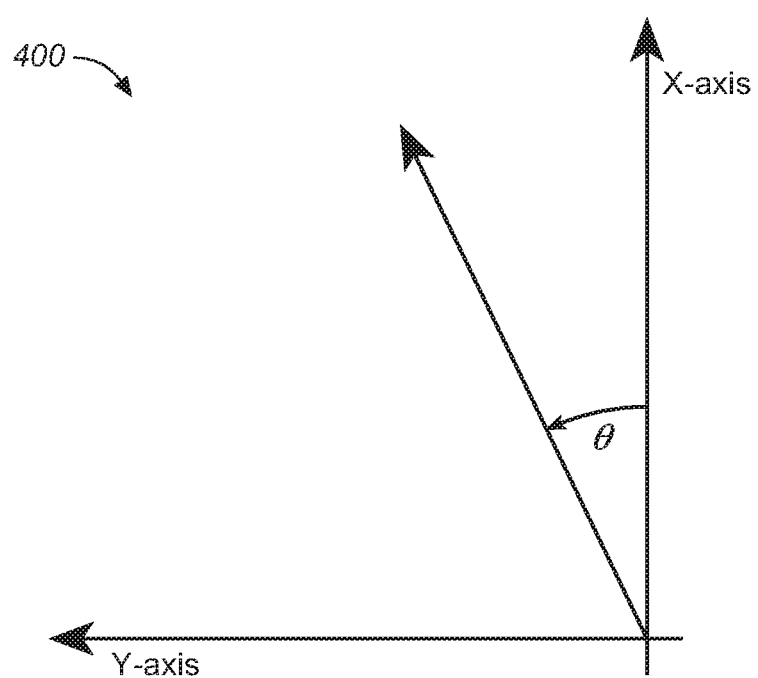
FIG. 4 illustrates a coordinate system for representing the format of an N-Channel soundfield signal, under an embodiment.

FIG. 4 illustrates a coordinate system for representing the format of an N-Channel soundfield signal, under an embodiment. As shown in FIG. 4, the coordinate system 400 comprises the X-axis pointing forward, the Y-axis pointing to the left, and the Z-axis (not shown) pointing upwards. In a teleconferencing system, the Z-axis is generally not used, since many signals are representative of soundfield signal components in the horizontal plane only. That is, there is no appreciable height component to the soundfield audio signals, since height or vertical position of a talker is generally not a critical aspect of telephone conversations. In certain other applications in which height may be important such as live performance transmissions (e.g., concerts, plays, etc.), the soundfield coordinate system may be extended to include the Z-axis.

As also shown in FIG. 4, an azimuth angle θ is measured anticlockwise from the X-axis. In an embodiment, the N-channel soundfield signal 119 is formatted in conformance with left, right, surround (LRS) conventions. An LRS signal is composed of three audio signals, as recorded by the cluster of three cardioid microphones (L,R,S) of FIG. 2, which are used to capture audio in the LRS signal format. Whenever these signals are recorded in a WAV (waveform audio) file, or transported as a bundle of three PCM (pulse code modulated) signals, they are conveyed in the order LRS, where the three channels correspond to cardioid microphone signals at azimuth angles of 60°, −60°, and 180° respectively. Such a PCM stream may scaled in accordance with system configuration and application requirements. For example, the PCM stream may be referred to as a −31 dB reference level LRS stream if a 1 kHz sine-wave tone at 85 dB (SPL), incident on-axis to one of the cardioid microphones, appears in the PCM signal as a sine wave with an RMS level that is at −31 dB relative to a full-scale sinewave.

The LRS signal can also be represented or is transformed into the B-format using the coordinate system of FIG. 4. The WXY signal is composed of three audio signals (individually named W,X,Y) that correspond to an omni-directional microphone signal (W) along with two dipole microphone signals (X,Y) that have their maximum positive gains aligned with the X and Y axes respectively. As stated above, the B-format signals are based on a spherical harmonic decomposition of the soundfield and correspond to the sound pressure (W), and the two components of the pressure gradient (X, Y) at a point in space. Together, these approximate the sound field on a sphere around the microphone and is formally the first-order truncation of the multi-pole expansion. The transformation the LRS signal to the WXY B-format may be performed using a linear mapping function defined by a warping matrix (e.g., a 3×3 matrix), or a target covariance matrix, or any other appropriate method as may be known by those of ordinary skill in the art.

Figure 5A:
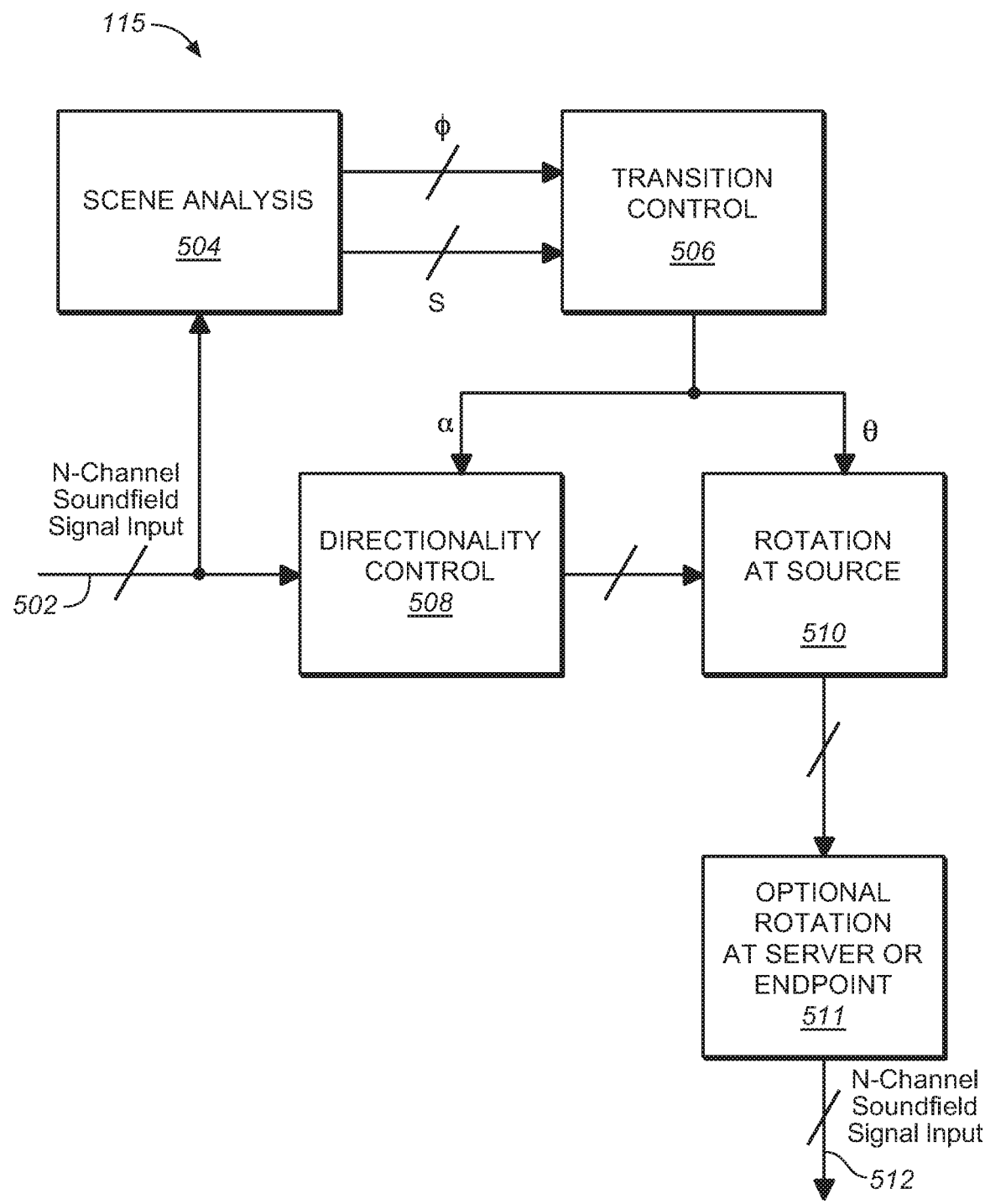
FIG. 5A is a block diagram of functional components of a soundfield module, under an embodiment.

Once the N-channel soundfield signal is appropriately formatted, it is processed in the functional components of soundfield module 115 located in a soundfield telephone 112 and/or a server 117. FIG. 5A is a block diagram of functional components of a soundfield module 115, under an embodiment. In this embodiment, a telephone call from or to soundfield telephone 112 begins in a spatially-reduced mode (e.g., monophonic signal) until such time as the system has established the presence of a person talking and knows where they are in the source location 102. At such time, the system rotates that talker to the reference angle θ (e.g., to zero degrees angle relative to the listener's audio device or a location considered/assumed to be the "front" of the listener) and transitions the output from monophonic to full soundfield transmission.

As shown in FIG. 5A, an N-channel soundfield representation (e.g., a first order B-format represented by the three signals W, X, Y) for input signal 502 is provided to the soundfield module 115. The input signal is provided to a spatial auditory scene analysis unit 504 in the soundfield module 115, which tracks sound sources within the soundfield and estimates parameters of each source to build a picture of where the sources of any particular type are within a room. Sources may be talkers and/or other noise or sound sources.

It is conventional to analyze (e.g., by applying statistical analysis to) an audio signal indicative of a soundfield, to segment the signal, and to identify audio objects indicated by the signal (e.g., an audio object indicated by each segment of the signal). The scene analysis unit 504 may implement one of the known techniques to analyze each segment (which may be a stream of audio data samples) of a signal representing a soundfield, and may identify segments of the signal as being indicative of sound emitted from a specific source or set of sources. Additionally, the scene analysis unit 504 may implement one of the known techniques to determine whether each identified sound source is voice or noise. An example of such known techniques includes using a classifier based on machine learning that is trained against a set of labeled speech and noise sources. The classifier can use input features like a segment's spectral flux, spectral shape, harmonicity, mean and variance of RMS level, and an apriori signal-to-noise ratio estimate. Based on these features, the classifier may classify a source as speech or noise.

It is also conventional to determine a scene "map" (or "scene description" or "sound scene") comprising data describing each audio object identified from an audio signal (e.g., data indicating a type or source of each object (i.e. speech or noise), and a location or trajectory of at least one source which emits the sound comprising the object). An example of an audio object is sound emitted from a specific source (e.g., voice uttered by a specific person). An example technique for determining a scene "map" includes using an online hidden Markov model (HMM) (e.g., with 32 or 64 states) with hidden state corresponding to the identity of a sound source. The input features to the HMM would be a covariance matrix of the W×Y values when the transmitting soundfield is represented in B-format. Such an HMM can track the location (expressed, in one embodiment, as angle of arrival φ) for a set of sources.

The scene analysis unit 504 may implement one of these known techniques to determine parameter S indicating whether an identified object is a talker's speech or noise, and to determine a location (indicated by an angle of arrival φ or another unit) of the identified object.

In one embodiment, the estimated parameters for a sound source generated by the scene analysis unit 504 are a location parameter indicating the location of the sound source in the transmitting soundfield (e.g., an angle of arrival φ of the sound) and an indicator S of whether each source is speech or non-speech (i.e., noise). The angle of arrival φ represents the angle that the incoming sound is picked up by any of the microphones 202 of the soundfield telephone relative to the primary axis 201 of the phone and is preferably expressed in polar coordinates, though other representations are also possible.

In one embodiment, the parameter S may be a value provided by speech recognition component (not shown) of the scene analysis unit, and indicates a measure of a degree of confidence that an input utterance constitutes speech or non-speech based on known modeling techniques. The parameter S may be expressed as a ratio, or a relative value within a range (e.g., from 1 to 10), or a binary value (i.e., 0 or 1) indicating a definite decision as to whether the source is a speech or non-speech source.

For each estimated parameter S and φ, the scene analysis unit also tracks an associated confidence estimate, such as based on a variance from a mean value for the parameter. For the confidence estimates, certain minimum (or maximum) threshold values may be defined by the system to provide an indication of when the confidence level for a parameter is sufficiently high (or low) enough to trigger an acceptance of a final value of the respective parameter. Such threshold values may be defined by the system as default values, or they may be selected by the user or administrator, based on limitations and requirements of the system.

The embodiment of FIG. 5A illustrates the use of two parameters by the scene analysis unit 504, namely source type S and angle of arrival $\phi$. It should be noted that these parameters may be supplemented or even replaced by other parameters depending on system constraints and requirements. Examples of other such parameters include a directivity index that indicates how wide or narrow a source is, and a direct-to-reverb ratio that provides an indication of distance of source from the microphone, among other similar parameters.

For an embodiment of soundfield module 115, the scene analysis unit 504 provides a set of angle of arrival $\phi$ and speech indicator S parameter values for each of the N channels, the provided set for a channel including a $\phi$ and an S for each sound source in a channel. These parameters are input to transition control unit 506 that makes use of the estimated parameters and their associated confidence estimates to control a transition from a non-spatial (e.g., monophonic) to a spatial (i.e., full soundfield) output signal. This transition is controlled by a directionality index $\alpha$, in which a first value (e.g., 0) indicates that processing is performed in non-spatial mode, and a second value (e.g., 1) indicates that processing is performed in spatial mode. The transition control unit 506 invokes such a transition once one of the sources tracked by the scene analysis unit has been determined to be speech with a certain minimum confidence and the same source has a known angle of arrival with a certain minimum confidence. Once these minimum confidence thresholds are met (presumably early in a teleconference call), the transition control unit first sets its output angle $\theta$ to $-\phi$ and then changes the directionality index $\alpha$ from 0 to 1. The change in directionality index may be made smoothly over a period of time, such as by changing $\alpha$ over a period of a few seconds, so that the listener hears the soundfield change from monophonic to completely spatial in a perceptually continuous manner. By setting $\theta$ to $-\phi$ the output soundfield will be rotated such that the first talker detected by the scene analysis unit with the requisite confidence will sound to the listener to be at reference angle of 0 degrees. In an embodiment, this angle may be defined to be at zero degrees from the x axis of the listener's audio device or perceptually in front of the listener. Because the change to the rotation angle is made while the directionality index $\alpha$ is at 0, the listener will generally not hear a change until this index is non-zero.

As shown in FIG. 5A, the directionality index $\alpha$ is provided by the transition control unit 506 to directionality control unit 508, which effects an optional reduction in directionality of sound sources within the sound field. When the directionality index is 0 or approaches 0, the output signal will contain less directionality, that is, it will approach a monophonic signal exhibiting no directionality. When the directionality index is 1 or approaches 1, the output signal will contain more directional information, that is, it will approach a soundfield. For the first order horizontal B-format representation of the given example, such directionality control may be applied using the following equation:

$$\begin{bmatrix} W' \\ X' \\ Y' \end{bmatrix} = \begin{bmatrix} 1 & 0 & 0 \\ 0 & \alpha & 0 \\ 0 & 0 & \alpha \end{bmatrix} \begin{bmatrix} W \\ X \\ Y \end{bmatrix}$$

As further shown in FIG. 5A, the angle $\theta$ is provided by the transition control unit 506 to rotation unit 510, which effects a rotation of the soundfield, and transmit the rotated soundfield for rendering to a listener through an endpoint device. In one embodiment, the transmitting soundfield is an isotropic soundfield and the soundfield is rotated without the loss of any information. For the first order horizontal B-format representation of the given example, this rotation function may be applied using the following equation:

$$\begin{bmatrix} W' \\ X' \\ Y' \end{bmatrix} = \begin{bmatrix} 1 & 0 & 0 \\ 0 & \cos\theta & -\sin\theta \\ 0 & \sin\theta & \cos\theta \end{bmatrix} \begin{bmatrix} W \\ X \\ Y \end{bmatrix}$$

The directionality control unit 508 and rotation unit 510 may process the transmitting soundfield in the order shown, or in the opposite order, or the processing of the two units 508, 510 may be combined into a single operation for efficiency. Note also that in the given example, only the W channel will have non-zero value at the start of the call. In certain embodiments, the system sends only the W (mono) channel of the output soundfield until such time that the other components (X, Y) are required.

As discussed above, a conversation may involve a listener talking to talkers located in different transmitting location, wherein sounds from each of the different transmitting locations are represented as different transmitting soundfields. With respect to processing multiple soundfields, rotation of each transmitting soundfield helps to ensure that when the listener hears multiple sound fields mixed together, that the primary talker in each sound field is perceived by the listener to emanate from a different location in the listener's soundfield. In an embodiment, rotation of the transmitting soundfields may be performed by different rotation modules within the system. For example, rotation may be performed on the source soundfield telephone 112, or it may be performed at least in part by a downstream module, such as by a server 117, or an endpoint telephone. Thus, as shown in FIG. 5A, an additional and optional rotation module 511 at the server 117 or receiving endpoint 130 may rotate the transmitting soundfields after or instead of the rotation performed by the rotation module 510 at the source endpoint 112*a*.

Figure 5B:
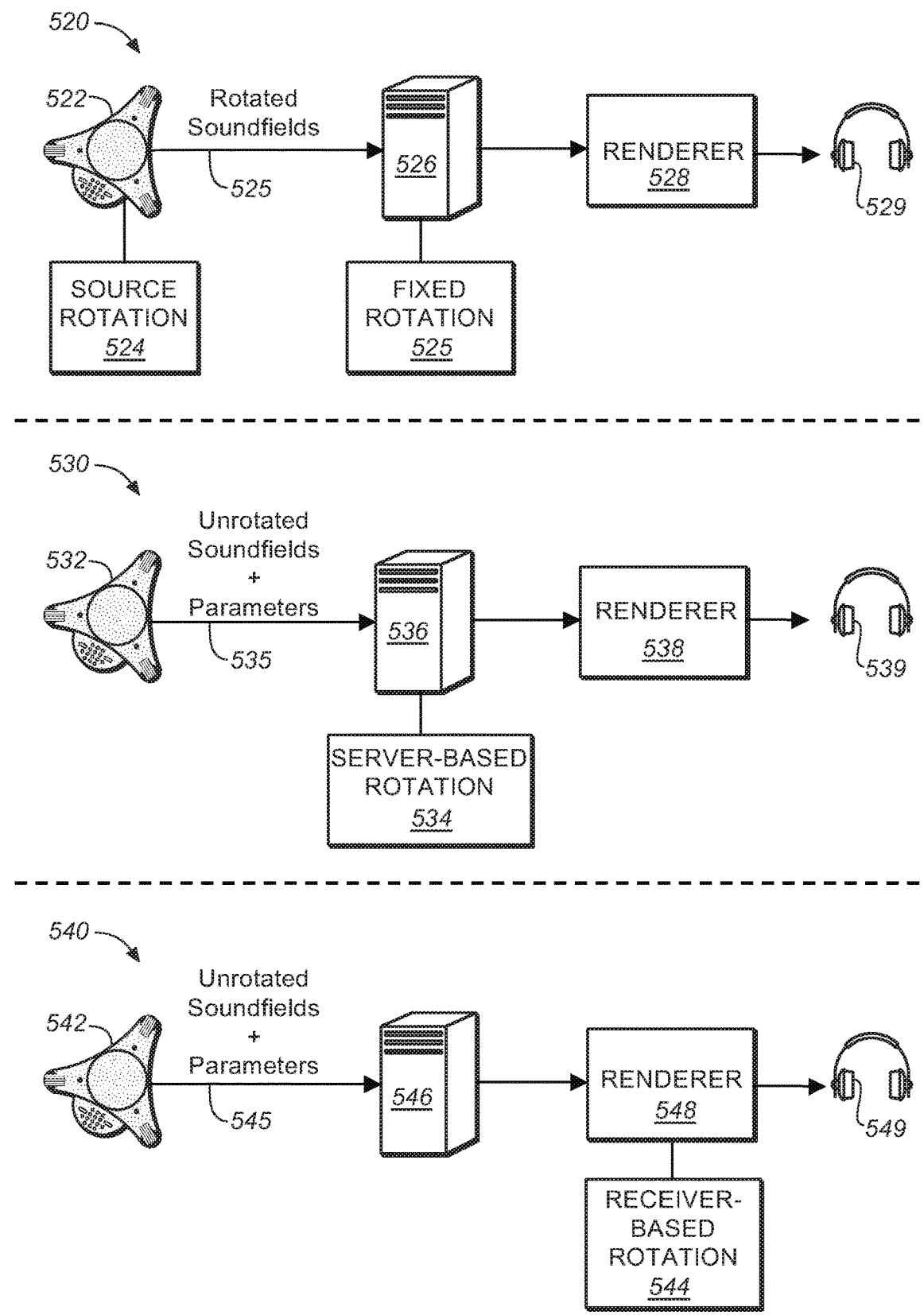
FIG. 5B illustrates the performance of the rotation process by different possible functional components, under some embodiments.

FIG. 5B illustrates the performance of the rotation process by different possible functional components, under some embodiments. In a first embodiment, 520, the soundfield telephone 522 includes a rotation module 524 (source rotation). In this embodiment, the rotation module 524 rotates each transmitting soundfield before they are transmitted from the sending telephone 522. The rotation of each transmitting soundfield results in a primary talker being moved to a location at a reference angle with respect to the soundfield telephone 522, e.g., 0 degrees from the soundfield telephone 522. The 526 server receives the rotated soundfield data 525 and applies a fixed rotation (e.g., −30, 0 +30) through rotation module 525 to each sound field before mixing them. The mixed soundfields are then transmitted to renderer 528 for playback through headphones 529 or other playback medium.

In a second embodiment 530, one or more soundfield telephones 532 do not execute a local rotation process, but instead send to server 536 unrotated transmitting sound fields along with the respective scene analysis parameters S and ϕ and their associated confidence values 535. The rotation module 534 at server 536 rotates each transmitting sound field at the point of mixing so that the first talker in each transmitting sound field is moved to different locations in listener's soundfield. The mixed soundfield signal is then transmitted to renderer 528 for playback through headphones 529 or other playback medium. As compared to the source rotation embodiment of 520, embodiment 530 moves all of the rotation tasks to the server at the expense of having to send the S, ϕ parameters and the confidence values upstream to the server.

In a third embodiment 540, one or more soundfield telephones 542 send unrotated transmitting sound fields to the server 546 along with the respective scene analysis parameters S and ϕ and their associated confidence values 545. The server 546 forwards all the streams down to a rendering component 548, which performs rotation and mixing through a receiver-based rotation module 544. The rotated and mixed soundfields are then transmitted directly to headphones 549 or other playback medium.

Figure 5C:
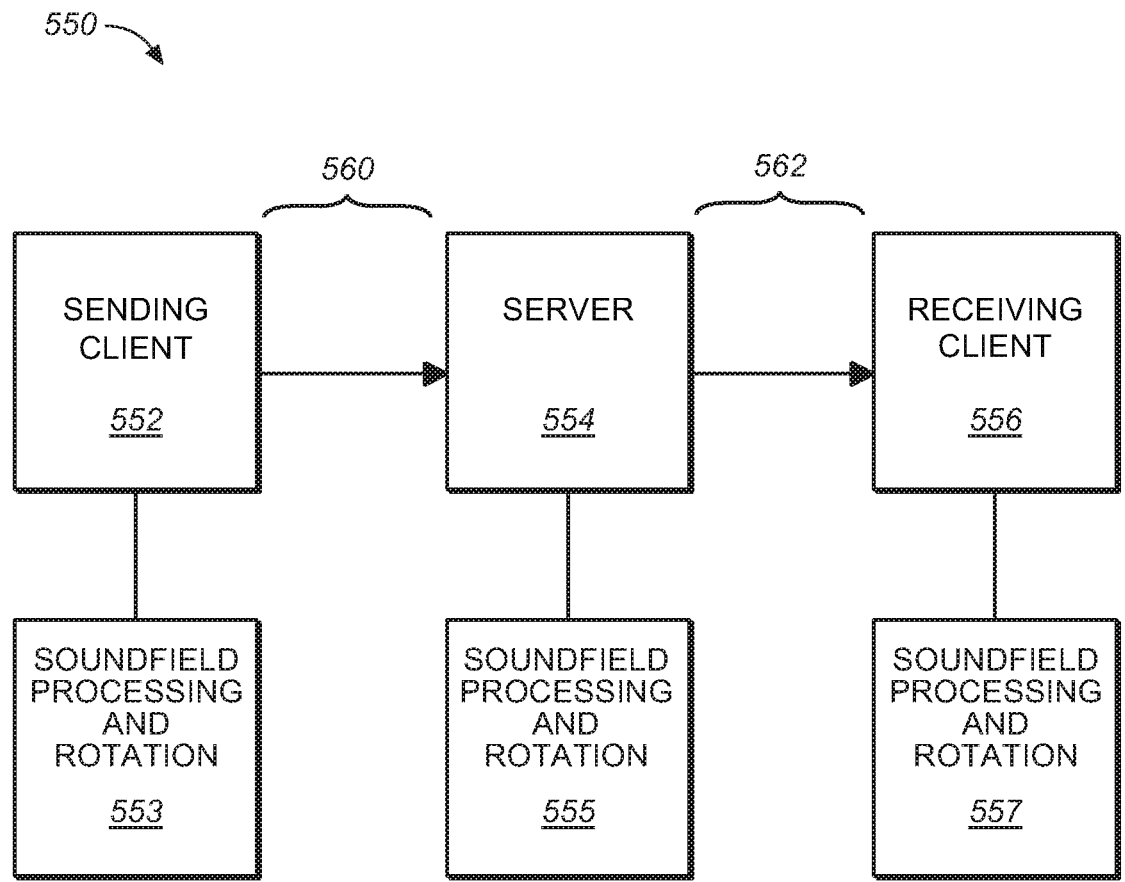
FIG. 5C illustrates a general system for performing soundfield processing, under an embodiment.

In general, the various components of FIG. 5B can be extended to a client-server type of system in which a plurality of clients transmit and receive soundfield signals through a server for processing by soundfield components resident in any or all of the client and server devices. FIG. 5C illustrates a general system for performing soundfield processing, under an embodiment. FIG. 5C illustrates certain rotation and other soundfield processing tasks may be split among a server and the sending and receiving clients. As shown in FIG. 5C, a sending client 552 represents a soundfield telephone 112 or any other source device that can generate one or more soundfields for talkers and noise sources and that may include a resident soundfield processing and rotation module 553; server 554 represents a central server 117 or any other device that can receive signals from the source device and includes soundfield processing and rotation module 555; and receiving client 556 represents a renderer (e.g., binaural renderer 120 or surround renderer 121) or endpoint device (e.g., phones 130 or 132) that playback the soundfield signals processed by server 554, and that may also include a resident soundfield processing and rotation module 557. Modules 553, 555, and 557 rotate one or more source soundfields to some reference angle relative to a transmitting endpoint, listener, or listener's endpoint, which may be zero or non-zero depending on system configuration and requirements. In some embodiments a first rotation by one process may be followed by a second fixed rotation downstream.

In an embodiment, each soundfield processing module 553, 555, 557 may contain scene analysis and other components, such as illustrated in FIG. 5A. Given the distributed soundfield processing and rotation functions among the three main components 552, 554, and 556, the various combinations of rotation processing among these component can be divided into upstream processing 560 where processing occurs between the server and the sending client, and downstream processing 562 where processing occurs between the server and the receiving client.

With respect to the upstream processing 560 embodiment, soundfield processing and rotation may be performed all on the server 554 or all on the sending client 552. Variations include performing rotation after a scene analysis operation, such as by the sending client 552 forwarding unrotated audio plus scene analysis parameters upstream to the server 554 with all rotation done on the server; after a first rotation operation, such as by the sending client 552 forwarding pre-rotated audio such that the primary talker is at 0 degrees (or other reference angle), and the server 554 then re-rotating it to a new angle; after any second rotation, such as by the sending client 552 being instructed by the server 554 what final angle it should rotate to and then sending a fully rotated soundfield.

With respect to downstream processing 562, soundfield processing is split between the server and the receiving client. Variations include performing rotation after the scene analysis unit, such that all processing including scene analysis occurs on the receiving client; performing rotation after a scene analysis process, such as by the server 554 forwarding unrotated audio plus scene analysis parameters downstream with all rotation done at the receiving client 556, or by the server 554 forwarding pre-rotated audio to the receiving client 556, which then re-rotates it to a new angle; or performing after any second rotation, such as by the server forwarding audio that is fully pre-rotated.

Because the receiving client is not necessarily impacted by the fact that any of the upstream steps had been performed on the server or on the sending client, other distributions of soundfield processing and rotation tasks may be possible including arbitrarily distributing parts of the processing between the sending client, the server and the receiving client as required based on system configuration and constraints, and application requirements.

In certain other embodiments, system 550 may not include a central server 554. In such a peer-to-peer system, a sending client 552 communicates directly with a receiving client 556, and either or both of these device may include a respective soundfield processing and rotation module. Alternatively, system 550 may include multiple servers 554 in a cascaded system where different processing components of the soundfield module and/or different aspects of the rotation operation(s) are done on different servers.

Figure 6:
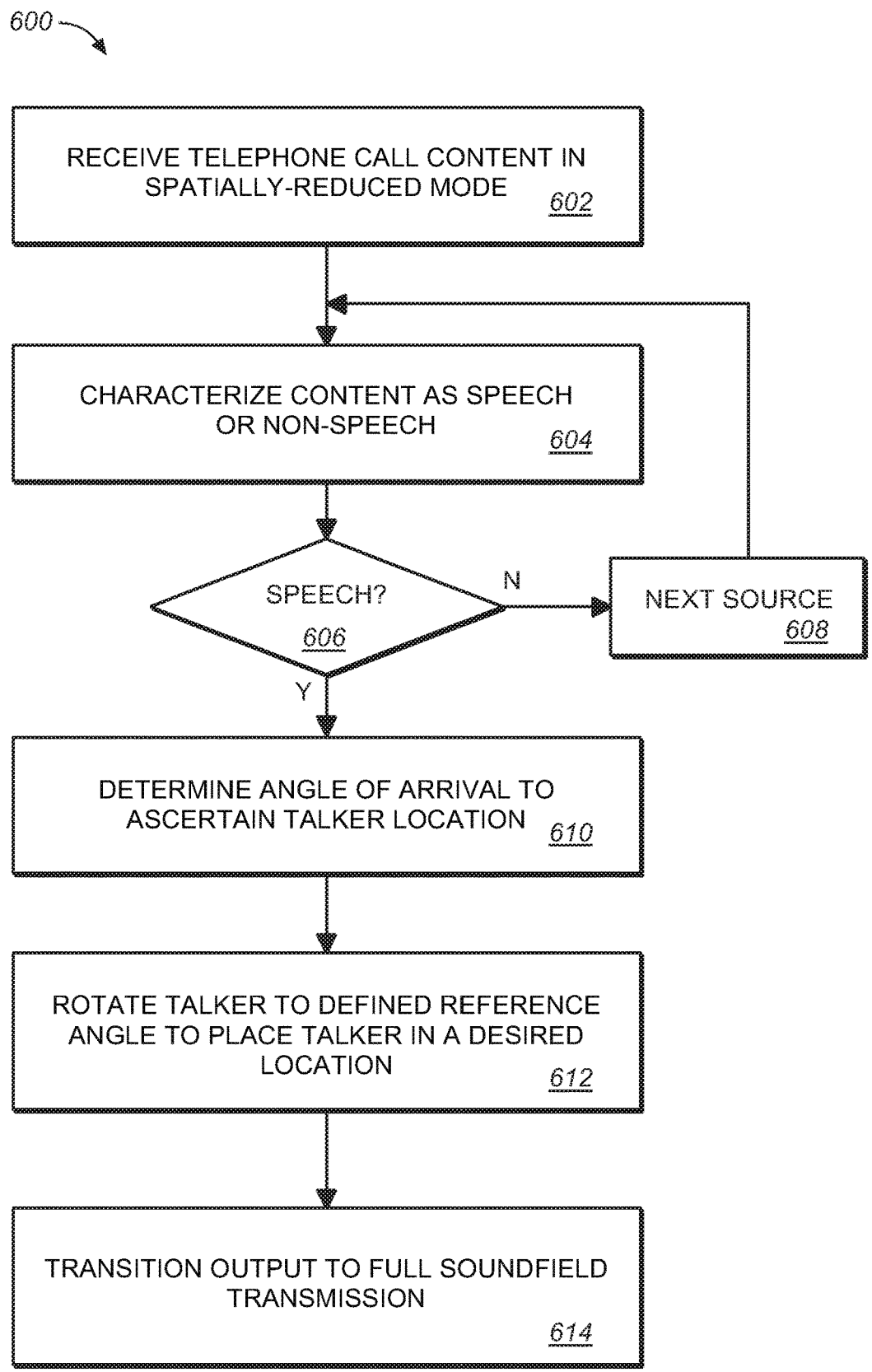
FIG. 6 is a flowchart illustrating a method of soundfield processing, under an embodiment.

FIG. 6 is a flowchart illustrating a method of soundfield processing, under an embodiment. Such a method 600 may be implemented using some or all of the functional components of soundfield module 115 of FIG. 5A in the context of processing a conference call with multiple talkers transmitted to one or more listeners. The process begins by the system receiving a telephone call from a soundfield telephone, act 602. The telephone call content is originally received and processed in spatially-reduced mode, such as a monophonic signal. The scene analysis unit builds models of each of the sources within the room to an audio picture of the room. Upon detecting an utterance or receiving input from one or more sources, a scene analysis unit or another component within the system determines whether the content from a particular source is speech or non-speech (noise or other sound), to verify the content as speech versus noise, act 604. For a teleconference application, this step establishes the importance of speech as the main content to be focused on by the listener.

In many cases, the first instances of a conference call is typified by the presence of spurious noise, such as murmurs, incomprehensible idle conversation, shuffling papers, clicks and alerts as people sign on, and so forth. In an embodiment, the system attempts to identify a first bona fide talker as the primary talker for focus by the listener. For example, the system identifies a talker as bona fide talker (and the primary talker) if the talker is the talker in the transmitting soundfield to talk for a majority of time during a pre-determined duration of the call. Thus, if a particular or initial source is processed and determined not to be a speech source in decision block 606, the system processes the next source, act 608 until speech is detected from a particular source. In an embodiment, this initial speech source is assumed to be the primary talker. In another embodiment, a speech source that occupies a majority of the speaking time for a pre-determined amount of time is determined to be the primary talker.

The system ascertains the location of the talker within the room, e.g., by determining an angle of arrival of the speech signals to the microphone, act 610. In certain embodiments the angle of arrival for a source may be determined prior to characterization of content from the source as speech or non-speech. With multiple people situated around a phone that has an array of microphones, the talker may not be located at a perceptively optimum location relative to a primary axis of the phone, and may therefore sound offset or dislocated to a listener. Once the angle of arrival for the talker is determined, the soundfield including the talker is rotated to place the talker at a desired location as described above so that the talker sounds as if he is located in front of the listener (or at some other desired location), act 612. The telephone output is then transitioned from the reduced spatial transmission to a full soundfield transmission, act 614.

As illustrated in the flowchart of FIG. 6, an initial recognized speech source is defined to be a primary talker and is rotated to a desired location relative to the listener's audio device for playback through the receiving system (e.g., binaural headphones or monitors). In an embodiment this talker is maintained in the desired location for the entire duration of the call. In an alternative embodiment, a second talker may be rotated to the desired location after the first talker has finished. This may be useful in the case where the initiator of a call is the first person to speak, but is not necessarily the primary talker during a call. In other embodiments, the system may be configured to rotate the transmitting soundfield to move a talker to the desired location in listener's soundfield when the talker begins to talk. In this case, talk time for each talker may be measured and compared against a defined minimum amount of talk time to affect rotation of transmitting soundfield and prevent constant rotation of the soundfield around the listener.

Figure 7:
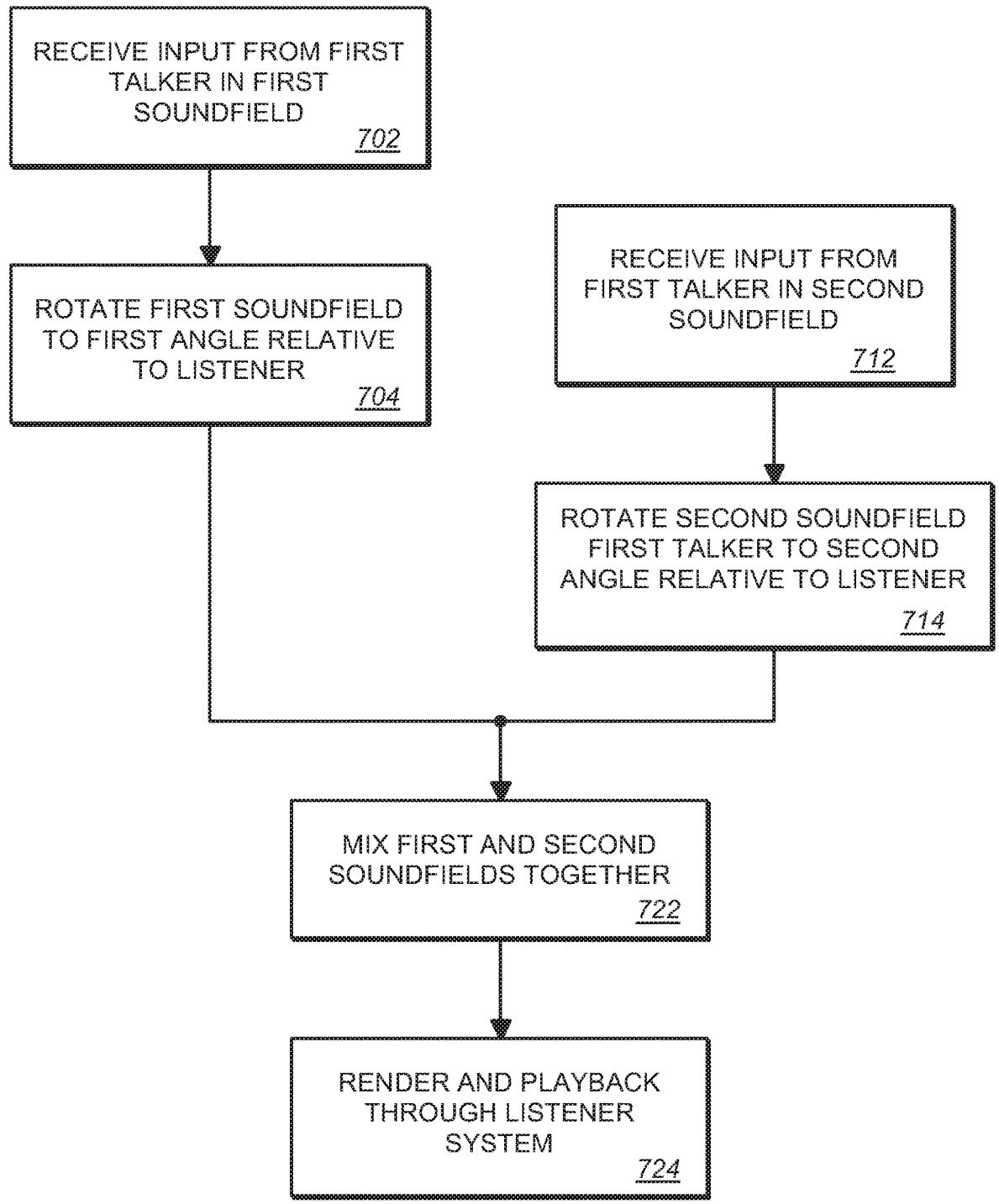
FIG. 7 is a flowchart that illustrates a method of mixing a plurality of transmitting soundfields in a manner that avoids overlap between primary talkers of the transmitting soundfields.

The rotation module 116 helps to enhance clarity among various talkers in a source environment by rotating the soundfield to move at least one talker to a known angle. Because the soundfield, and not the primary talker, is rotated the rotation keeps other talkers in the soundfield at same angular locations relative to each other. FIG. 7 is a flowchart that illustrates a method of mixing a plurality of transmitting soundfields in a manner that avoids overlap between primary talkers of the transmitting sound filed, under an embodiment. In certain configurations, the soundfield module 115 may receive input from multiple soundfield telephones 112 or source environments 102, each of which may provide a separate soundfield to the soundfield module 115. Alternatively, each of the one or more talkers or sound sources within a room (e.g., room 102) may provide a separate soundfield. For example, in a source room with individual phones or microphones, two channels for each talker or sound source may comprise an individual soundfield. Some talkers may be grouped or combined within a single soundfield, but others may be considered to produce separate soundfields. This may be the case where a particular talker joins a call late, or is remote enough to be considered separate from the other talkers, or if the microphone array is configured to pick up sounds from significantly separate locations of a large area.

As shown in FIG. 7, the soundfield system receives input from a primary talker in the first transmitting soundfield, act 702. The system rotates the first transmitting soundfield by a first angle to place the primary talker at a first location relative to the listener as described previously, act 704. In one embodiment, the listener is assumed to be at a fixed location in reference to the soundfield telephone 112 at source environment 102 and/or the audio device rendering the listener's soundfield. Accordingly, rotating a transmitting soundfield by an angle relative to the listener includes rotating the soundfield relative to the fixed location assumed for the listener.

Regardless of the criterion for determining the listener's location, any time after reception of the first transmitting soundfield input, the system receives input from a primary talker in a second transmitting soundfield, act 712, and rotates the second transmitting soundfield to locate this talker to a second angle relative to the listener, act 714. In one embodiment, the first and second angles are selected to be far enough apart so that the primary talkers in the first soundfield and the second soundfield sound as if they emanate from different locations relative to the listener. This selection thus ensures that the first talker of the first soundfield is separated from the first talker in the second soundfield. The first and second soundfields are then mixed together, act 722, to form a conglomerate or combined soundfield, i.e. the listener's soundfield. The separation of primary talkers of transmitting soundfields in the listener's soundfield ensures that at least certain talkers within the listener's soundfield are not coincident or overlaid with one another when heard by the listener. The listener's soundfield is then rendered and played to the listener through the appropriate listener endpoint system, act 724.

FIG. 7 illustrates a process in which the primary talker in each of two or more soundfields is rotated to a different reference angle so that these talkers do not appear directly on top of each other in listener's soundfield. In an embodiment, this may be performed in two steps: first, each soundfield telephone capturing the talker's soundfield rotates the captured soundfield to place the primary talker at a reference location (e.g., at 0 degrees in relation to the capturing telephone) before sending the soundfield to the server; and second, the server or downstream endpoint rotates the received soundfields again by different amounts before mixing them together.

Alternatively, this may be done by following two steps: first, each soundfield telephone sends an unrotated transmitting soundfield along with the scene analysis parameters (S, $\phi$, and confidences value); and second the server applies a single rotation to each soundfield prior to mixing such that the primary talker in each transmitting soundfield is placed in different locations in the listener's soundfield. The server, in this alternate embodiment, determines the single rotation for each transmitting soundfield based on the primary talkers' locations (represented by a parameter like $\phi$) in the transmitting soundfields. Because the primary talkers' locations are transmitted to the server, the server may use these known locations to determine the amount of rotation for the two transmitting soundfields. For example, if the primary talker in the first soundfield is located at 5 degrees from a reference location and the primary talker in the second soundfield is located at −10 degrees from the reference location, the first soundfield is rotated by 25 degrees and the second soundfield is rotated by −20 degrees. Because of this rotation, the two primary talkers are located at +30 degrees and −30 degrees in the listener's soundfield.

Such rotation is useful in many cases like a case where the listener will receive relatively equal dialog from talkers in two different soundfields. Instead of having the talkers sound as if they are both talking from in front of the listener, they could be rotated to either side of the listener or other appropriate positions. That is, the system can be configured to set up a triangular arrangement of two primary talkers and the listener rather than a binary arrangement of primary talkers on one end and the listener on the other.

Figure 8:
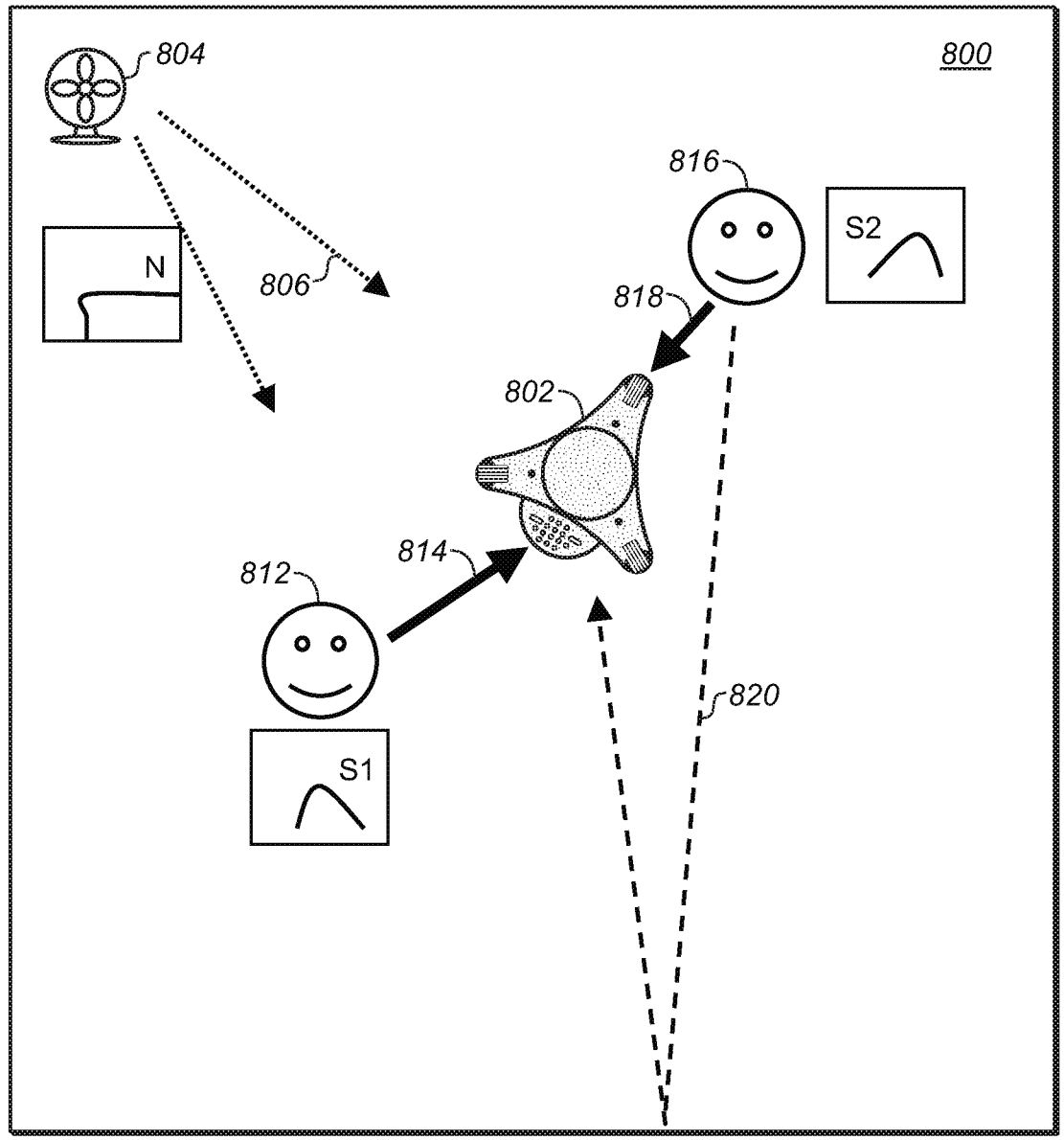
FIG. 8 depicts an example of an acoustic scene defined and tracked by a scene analysis unit, under an embodiment.

As shown in FIG. 5A, the scene analysis unit 504 builds an audio picture of the soundfield within a room by identifying the location of sound sources in the room and establishing their content type in terms of speech or non-speech. FIG. 8 depicts an example of an acoustic scene defined and tracked by a scene analysis unit, under an embodiment. The acoustic scene within room 800 is recorded using a soundfield microphone array or telephone 802. Two talkers 812 and 816 participate in the conference at this endpoint. One or more noise sources, such as fan 804 may also be present or project sound into the room. Common examples of such noise sources include fans in computers, servers, projectors, air conditioners, heaters, and so on.

As is well known in the field of acoustics, sound propagates directly from the mouths of the talkers to the microphone, as well as propagating by way of reflection from the walls, floor, ceiling and other objects within the room. Thus, as shown in FIG. 8, talker 812 projects speech soundwaves 814 and talker 816 projects speech soundwaves 818 to soundfield telephone 802, and depending on acoustic conditions, room size, volume levels and so on, some soundwaves (e.g., 820) may be reflected off of one or more walls of room 800. At the same time, noise source 804 may transmit a constant amount of noise 806 that can also be picked up by soundfield telephone 802.

A listener actually present in room 800, such as in the same position as soundfield telephone 802 would experience all of the sound generated in the room. A telephone conference system would typically attempt to filter certain content, such as noise 806 and reflected signals 820, and enhance certain other content, such as direct voice signals 814 and/or 816 to optimize call clarity. The resulting signal would then be further compressed for transmission over bandwidth limited telephone lines, resulting in a final audio representation that is often a distorted version of the original audio environment. Embodiments of the scene analysis unit 504 and other components of soundfield module 115 capture and transmit a more accurate soundfield content through certain modeling and normalizing techniques. Thus, a further activity required to optimally process the acoustic information is to retain and/or impose some degree of separation between relevant talkers so that there can be maintained some perception of distance between different talkers. Another activity for optimal soundfield representation is the transmission of noise or other sounds within the soundfield, as opposed to the filtering or suppression applied in present teleconference phone systems.

In an embodiment, scene analysis unit 504 builds separate models for each of the sources within the room 800. As shown in FIG. 8, a model denoted N is built for the noise (non-speech) source (fan) 804, a first speech model denoted S1 is built for talker 812, and another speech model denoted S2 is built for talker 816. The scene analysis unit 504 then uses probabilistic techniques and historical information to determine what angle of arrival is associated with each source. It also characterizes whether each source is speech (S) or noise (N).

In an embodiment, the historical information may be reset at the start of each conference call, or may persist across multiple calls. For example, the scene analysis unit 504 may determine that a certain angle of arrival in the room is more often associated with a certain talker than other locations and use that information over a period of days or weeks to more quickly converge on a map of the sound sources involved in each conference call. Embodiments described herein describe the use of such a scene analysis unit to perform pre-emptive rotation of a soundfield to provide location normalization of relevant sound sources within a soundfield. In this case, a soundfield from a particular device may be pre-rotated, or certain pre-processing steps may be performed to speed the characterization and angle of arrival estimates based on known previous values.

Figure 9:
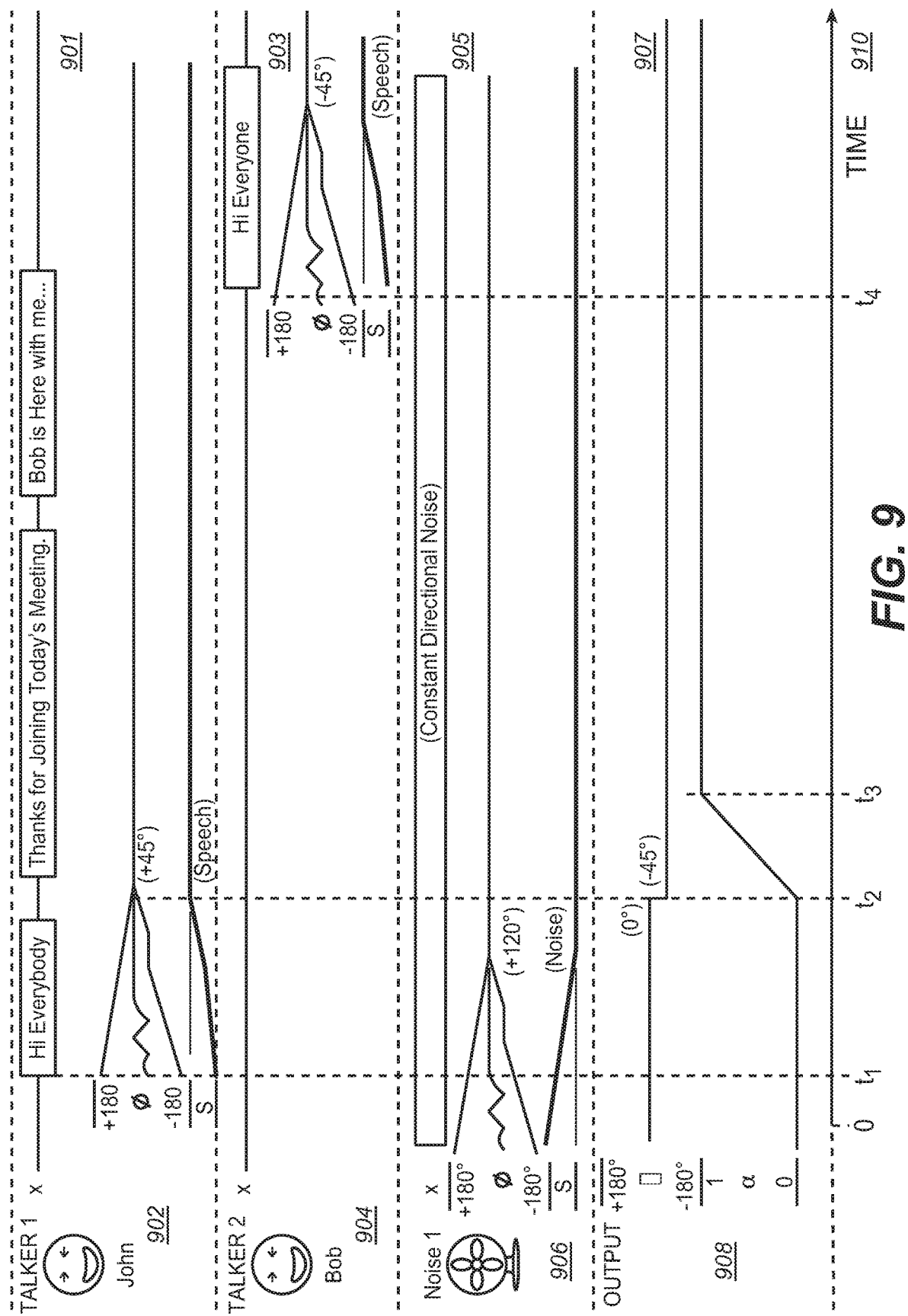
FIG. 9 is a flow diagram illustrating an example operation of a soundfield processing system, under an embodiment.

FIG. 9 is a flow diagram illustrating an operation of a soundfield processing system, under an embodiment. FIG. 9 is intended to illustrate operation of system 100 during a beginning period of an example phone call for the acoustic scene of FIG. 8. FIG. 9 illustrates the creation of three different input sound models 902, 904, and 906 for each of the sound sources in a room. The scene analysis unit 504 receives a transmitting soundfield including these three sound sources and creates the sound models to determine the amount of rotation required to place a primary speaker at a desired angle in the listener's soundfield 908 (also referred to "output soundfield" in reference to FIG. 9). For the embodiment of FIG. 9, the models comprise angle information and sound classification information as provided over a time axis 910 during a certain period (e.g., the beginning) of a phone call. The sound source models 902, 904, and 906 illustrate the definition of the angle of arrival $\phi$ and sound type S parameters for each respective source, and the output model 908 illustrates the definition of the directionality index $\alpha$ and the rotation angle $\theta$ for the sound rendered to the listener.

As shown in FIG. 9, Talker 1 (John) is located at +45 degrees relative to a reference point in the transmitting soundfield. Talker 2 (Bob) is located at −45 degrees. A noise source is located at +120 degrees and is active throughout the illustrated portion of the call. These angles of arrival $\phi$ are derived after certain period of processing time (e.g., one to three seconds) during which each sound input is analyzed and tracked. When the call is initiated at a certain time (time 0) the scene analysis unit 504 begins tracking the sound sources in the transmitting soundfield and building an estimate of its angle of arrival. A temporal averaging technique is used to reduce the error range over time to construct an increasingly more accurate model. Thus, as shown in FIG. 9, initial estimates of arrival angle range from +/−180 degrees and are refined over time through temporal averaging to settle on a final value relative to a minimum threshold error value.

Similarly, the S parameter is initially defined and then refined to indicate in the model whether the content is speech or noise. The speech parameter S may be a binary parameter that defines a value of 0 as non-speech and a value of 1 as speech. As shown in FIG. 9, the scene analysis unit 504 sets the S parameter at a certain initial value (0 or 1), and uses speech recognition techniques to refine the initial estimate over time to finally decide whether the source is a speech or non-speech source.

For the example conversation of FIG. 9, at time instant t1, Talker 1 (John) starts talking by uttering the sentence "Hi everybody . . . . Thanks for joining today's meeting . . . . Bob is here with me . . . . " As illustrated in the phrase portion of the model, the phrase may be uttered as a sentence containing pauses. The scene analysis unit 504 begins tracking John as a new source, and initially assigns a large error to both the angle of arrival φ and speech/noise S parameter estimates. These estimates improve as more speech is tracked over time, so that by time instant t2, the scene analysis unit 504 has accumulated sufficient information that it is confident that its estimate of angle of arrival and speech/noise classification for talker 1 exceed the required thresholds. As shown for model 902, John is identified with sufficient confidence as a talker and not a noise source sound located at 45 degrees in the transmitting soundfield. At this point, the transition control unit 506 sets θ=−45 degrees so that the transmitting soundfield is rotated to place John at zero degrees relative to the reference point (the reference point, in one embodiment, is also assumed to be location of the listener) in the listener's soundfield. As shown in model 908, at time instant t2, the transition control unit 506 also begins the transition from mono output to fully spatial output by varying directionality index α from 0 to 1. By time instant t3, the system is producing fully spatial output. At time instant t4, the scene analysis unit 504 begins tracking Talker 2, Bob, who utters the phrase "Hi everyone . . . " His location and content type are also determined by the scene analysis unit 504. However, in the example shown in FIG. 9, the transmitting soundfield is not rotated again once a primary talker (i.e. talker 1) has been identified and the transmitting soundfield has been rotated to place the primary talker at a desired location in listener's soundfield. The transition control unit 506 therefore does not rotate the transmitting soundfield again after content type and location of the second talker (and any subsequent talker) are determined.

With regard to the fan noise source model, the scene analysis unit's initial estimate of whether the source is noise or speech improves over time until it is confident that the source it is tracking is a noise source. It also estimates an angle of arrival for this noise as +120 degrees. Because talker 1 has been identified as the primary talker and the transmitting soundfield has been rotated by −45 degrees, the angle of arrival for the noise source in the rotated soundfield will be shifted to 85 degrees (120−45). Like talker 2, identification of this sound source also does not lead to any additional rotation of transmitting soundfield because talker 1 has already been identified as the primary talker. Even if the noise source's content type and location had been confirmed before any talker, the noise source would not have been identified as a primary talker because it's generating noise and not speech. Accordingly, the transition control unit 506 would not have rotated the transmitting soundfield to place the noise source at a desired location in the listener's soundfield.

As shown in FIG. 9, the incoming call is processed at time t0 which is when the call is first received by the soundfield telephone 112 and sent to server 117 for processing. The system may be configured to delay processing until a set time after the reception of a call, or the scene analysis unit and transition control unit may be configured to ignore the initial system and talker noise when the call is first received and wait until these units have confidently established that a single talker is talking.

For the embodiment described above, rotation of the transmitting soundfield by a first amount represents rotation of first (primary) talker and other sound sources in the transmitting soundfield by the same first amount (since each source is maintained in the same relative location of the primary talker). This rotation thus rotates all of the soundfield sources by the same angle. In an alternative embodiment, one or more other sources may be rotated by a different amount or may be set to a static location. Such an embodiment may enhance separation by introducing a certain amount of spread between the sources.

In an embodiment, a graphical user interface (GUI) may be provided as part of or in conjunction with soundfield module 115 to provide tools for user interaction with the soundfield module 115. For example, the models compiled by the scene analysis unit 504 may be displayed to a listener on a graphical user interface (GUI) as a map or list representation, and/or a graphical display of the room showing the estimated type and location of sound sources, such as depicted in FIG. 8 may be displayed to the listener. Thus providing a visual representation of the soundfield to the user. In certain embodiment, the soundfield module 115 may be implemented in a video conferencing system in which a camera films the source room, and the listener can view the camera feed through video monitors. In this case, the video feed provides the graphical representation of the soundfield as an actual video of the room itself. In this case, model information such as shown in FIG. 9 that is generated by the soundfield module 115 may still be displayed to the user to augment the display of people and objects in the room that are seen through the video.

In a further alternative embodiment, the GUI may be configured to provide the listener with certain controls over the operation of the soundfield module 115. For example, as described above, the soundfield module 115 may be configured to switch and rotate among different users instead of locking onto a particular user for the entire duration of a phone call. In this case, the GUI may provide control functions that allow the listener to instruct the transition control unit to lock to the currently active talker or to not rotate among different talkers. In a system where a location map is displayed or other indication of talker location is provided, the GUI might provide a tool or command button that instructs the transition control unit 506 to lock to a particular source by, for example, clicking on a button associated with each source or map entry.

In yet a further alternative embodiment, the system may prompt the user and ask whether or not to lock to a new source. For example, as stated above, the scene analysis unit 504 may retain history between calls. Thus, the soundfield module 115 may know that a certain seat is commonly occupied by the first talker in a large proportion of conference calls. If, in a particular conference call the first talker is in a different seat, the user may be prompted "The first talker in this conference is at an unusual location. Do you want to lock to him/her?" or equivalent text by means of a GUI or other human interface technique may be presented. Certain voice recognition or visual recognition techniques (in a video conference system) may likewise be employed to recognize certain talkers or sound sources and either lock to them or keep the system from locking to them. Alternatively, the models (e.g., N, S1, and S2) that are generated for a certain call may be stored and recalled in subsequent calls and used to speed processing for future conversations that might involve the same source environment and/or talkers.

Embodiments are thus directed to a system and method of soundfield telephony that presents talkers' soundfield to a listener in a convenient manner. In addition to many advantages that would be apparent to one of ordinary skill in the art, the described system provides advantages over present telephone and business conferencing systems that attempt to filter and compress sound and noise to accentuate speech content. Though such systems are intended to increase call clarity, they do so at the expense of suppressing potentially useful content and also do not provide an accurate picture of the source soundfield. Embodiments of the present system provide a more accurate representation of the soundfield to the listener, and let the listener natural capabilities distinguish between useful and non-useful content. Embodiments further place primary speakers in a desired location for a listener, thus more accurately providing speech from a direction usually expected by the listener.

Embodiments have been described primarily in relation to a telephone conference system for soundfield processing in which the principal content is speech provided by human talkers. It should be noted however, that the disclosed embodiments can also be applied, with any necessary and apparent modification, to other applications such as systems processing mechanized/computerized speech or other content, such as music, sound effects, noise effects, and so on. In such cases the sound sources may be machines, computers, animals, or other things. Likewise, the room 102 may be any corresponding listening environment that is appropriate for the soundfield that is being captured and normalized for playback to the listener.

Aspects of the systems described herein may be implemented in an appropriate computer-based sound processing network environment for processing raw microphone or telephone content. Portions of the soundfield processing system may be implemented in one or more computer and/or telephone networks that comprise any desired number of individual machines, including one or more routers that serve to buffer and route the data transmitted among the network elements. Such a network may be built on various different network protocols, and may be the Internet, a Wide Area Network (WAN), a Local Area Network (LAN), or any combination thereof.

One or more of the components, modules, units, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method comprising:
receiving a soundfield, the soundfield including a plurality of sound sources at a plurality of locations, wherein the plurality of sound sources includes at least a sound source at a location in the soundfield, wherein the soundfield encodes sound pressure information and directionality information for each of the plurality of sound sources;
receiving a rotation angle for rotating the soundfield, wherein the rotation angle is based on a desired location for the sound source;
rotating the soundfield by the rotation angle, wherein rotating the soundfield rotates each of the plurality of sound sources by the rotation angle;
obtaining a listener's soundfield based on the rotated soundfield; and
transmitting the listener's soundfield for rendering to a listener through an endpoint device,
the method further comprising:
controlling a directionality of the soundfield, prior to rotating the soundfield.

2. The method of claim 1, wherein controlling the directionality of the soundfield comprises:
reducing the directionality of the soundfield.

3. The method of claim 2, wherein reducing the directionality of the soundfield comprises:
reducing the directionality of the soundfield according to a directionality index.

4. The method of claim 2, wherein reducing the directionality of the soundfield comprises:
reducing the directionality of the soundfield according to a directionality index, wherein reducing the directionality reduces the directionality information.

5. The method of claim 2, wherein reducing the directionality of the soundfield comprises:
reducing the directionality of the soundfield according to a directionality index, wherein reducing the directionality reduces the directionality information, and wherein the sound pressure information remains constant when reducing the directionality.

6. The method of claim 1, wherein controlling the directionality of the soundfield comprises:
selectively changing a directionality index between a first value and a second value, wherein the first value indicates that processing is performed in a non-spatial mode, and the second value indicates that processing is performed in a spatial mode.

7. The method of claim 6, wherein changing the directionality index occurs smoothly over a period of time.

8. The method of claim 6, wherein changing the directionality index occurs smoothly over a period of seconds.

9. The method of claim 1, wherein the soundfield corresponds to a first order B-format signal and a higher order extended signal.

10. The method of claim 1, wherein the soundfield is captured by an array of microphones oriented in different directions.

11. The method of claim 1, wherein the soundfield includes a B-format signal.

12. The method of claim 1, wherein the soundfield includes a B-format signal, wherein the B-format signal includes three channels; and wherein rotating the soundfield comprises applying a 3×3 matrix equation to the three channels of the B-format signal.

13. An apparatus comprising:
- a scene analysis unit for receiving a soundfield, the soundfield including a plurality of locations, wherein the plurality of sound sources includes at least a sound source at a location in the soundfield, wherein the soundfield encodes sound pressure information and directionality information for each of the plurality of sound sources;
- a transition control unit for determining a rotation angle for rotating the soundfield, the determination of the rotation angle based on a desired location for the sound source; and
- a rotation component for rotating the soundfield by the rotation angle, obtaining a listener's soundfield based on the rotated soundfield, and transmitting the listener's soundfield for rendering to a listener through an endpoint device,
- wherein the rotation component further controls a directionality of the soundfield, prior to rotating the soundfield.

14. The apparatus of claim 13, wherein the soundfield includes a B-format signal.

15. The apparatus of claim 13, wherein the soundfield includes a B-format signal, wherein the B-format signal includes three channels; and
- wherein rotating the soundfield comprises applying a 3×3 matrix equation to the three channels of the B-format signal.

16. The apparatus of claim 13, wherein controlling the directionality of the soundfield comprises:
- reducing the directionality of the soundfield.

17. The apparatus of claim 16, wherein reducing the directionality of the soundfield comprises:
- reducing the directionality of the soundfield according to a directionality index.

18. The apparatus of claim 16, wherein reducing the directionality of the soundfield comprises:
- reducing the directionality of the soundfield according to a directionality index, wherein reducing the directionality reduces the directionality information.

19. The apparatus of claim 16, wherein reducing the directionality of the soundfield comprises:
- reducing the directionality of the soundfield according to a directionality index, wherein reducing the directionality reduces the directionality information, and wherein the sound pressure information remains constant when reducing the directionality.

20. The apparatus of claim 13, wherein controlling the directionality of the soundfield comprises:
- selectively changing a directionality index between a first value and a second value, wherein the first value indicates that processing is performed in a non-spatial mode, and the second value indicates that processing is performed in a spatial mode.

21. The apparatus of claim 20, wherein changing the directionality index occurs smoothly over a period of time.

22. The apparatus of claim 20, wherein changing the directionality index occurs smoothly over a period of seconds.

* * * * *